US012304666B2

(12) United States Patent
Johnson et al.

(10) Patent No.: US 12,304,666 B2
(45) Date of Patent: May 20, 2025

(54) SPACECRAFT SYSTEMS AIRLOCK FOR INTERNATIONAL SPACE STATION ACCESS AND INTERFACE AND METHODS OF OPERATION

(71) Applicant: NanoRacks, LLC, Webster, TX (US)

(72) Inventors: Michael David Johnson, Tomball, TX (US); Mark David Rowley, Friendswood, TX (US); Michael Desmond Lewis, Kemah, TX (US); J. Brockton Howe, League City, TX (US)

(73) Assignee: NanoRacks, LLC, Webster, TX (US)

(*) Notice: Subject to any disclaimer, the term of this patent is extended or adjusted under 35 U.S.C. 154(b) by 31 days.

(21) Appl. No.: 18/165,567

(22) Filed: Feb. 7, 2023

(65) Prior Publication Data

US 2023/0382566 A1  Nov. 30, 2023

Related U.S. Application Data

(63) Continuation of application No. 17/062,103, filed on Oct. 2, 2020, now Pat. No. 11,718,425, which is a continuation of application No. 15/910,907, filed on Mar. 2, 2018, now Pat. No. 10,850,872, which is a continuation-in-part of application No. 15/264,238, filed on Sep. 13, 2016, now Pat. No. 10,569,911.
(Continued)

(51) Int. Cl.
| | |
|---|---|
| *B64G 1/64* | (2006.01) |
| *B64G 1/52* | (2006.01) |
| *B64G 1/14* | (2006.01) |
| *B64G 1/60* | (2006.01) |

(52) U.S. Cl.
CPC ............... *B64G 1/641* (2013.01); *B64G 1/52* (2013.01); *B64G 1/646* (2013.01); *B64G 1/14* (2013.01); *B64G 1/60* (2013.01)

(58) Field of Classification Search
CPC ................................ B64G 1/641; B64G 1/646
See application file for complete search history.

(56) References Cited

U.S. PATENT DOCUMENTS

| | | | | |
|---|---|---|---|---|
| 4,057,207 A | * | 11/1977 | Hogan ..................... | B64G 1/64 244/159.4 |
| 4,903,919 A | * | 2/1990 | Johnson ................. | B64G 1/646 244/172.4 |

(Continued)

OTHER PUBLICATIONS

Callen, Phillip. "Robotic Transfer and Interfaces for External ISS Payloads." 3rd Annual ISS Research and Development Conference. Jun. 2014. (Year: 2014).
(Continued)

*Primary Examiner* — Joshua J Michener
*Assistant Examiner* — Michael B. Kreiner
(74) *Attorney, Agent, or Firm* — Bookoff McAndrews, PLLC

(57) ABSTRACT

Embodiments provide a spacecraft airlock system. Embodiments provide a method and apparatus for attaching space exposed payloads to a space station. The spacecraft airlock system provides a defined volume of space payload to the international space station. The airlock further includes a means of attaching to a space station, a closed structure attached to said means, said means of attaching is capable of robotic manipulation, and a cooling system for cooling payload components within said closed structure.

20 Claims, 17 Drawing Sheets

Related U.S. Application Data

(60) Provisional application No. 62/218,427, filed on Sep. 14, 2015, provisional application No. 62/217,883, filed on Sep. 13, 2015.

(56) References Cited

U.S. PATENT DOCUMENTS

| | | | | |
|---|---|---|---|---|
| 6,045,094 | A * | 4/2000 | Rivera | B64G 1/60 244/159.4 |
| 7,207,525 | B2 * | 4/2007 | Bischof | B25J 15/10 244/172.6 |
| 7,413,148 | B2 * | 8/2008 | Behrens | B64G 1/1078 244/172.3 |
| 7,543,779 | B1 * | 6/2009 | Lewis | B64G 1/646 244/172.4 |
| 7,669,804 | B2 * | 3/2010 | Strack | B64G 1/646 244/172.4 |
| 7,780,119 | B2 * | 8/2010 | Johnson | B64G 1/402 244/173.1 |
| 8,047,473 | B2 * | 11/2011 | Johnson | B64G 1/646 403/171 |
| 8,967,548 | B2 * | 3/2015 | Goff | B64G 1/646 244/172.4 |
| 9,033,280 | B2 | 5/2015 | Bigelow | |
| 9,878,806 | B2 * | 1/2018 | Helmer | B64G 1/222 |
| 9,944,412 | B2 * | 4/2018 | Szabo | B64G 1/646 |
| 10,569,911 | B2 * | 2/2020 | Johnson | B64G 1/60 |
| 10,850,872 | B2 * | 12/2020 | Johnson | B64G 1/641 |
| 10,882,646 | B2 * | 1/2021 | Johnson | B64G 1/60 |
| 11,718,425 | B2 * | 8/2023 | Johnson | B64G 1/646 244/171.9 |
| 2015/0090842 | A1 * | 4/2015 | Bigelow | B64G 1/60 244/171.9 |
| 2017/0096241 | A1 * | 4/2017 | Johnson | B64G 1/60 |
| 2017/0259946 | A1 * | 9/2017 | White, Jr. | B64G 1/60 |
| 2018/0186479 | A1 * | 7/2018 | Johnson | B64G 1/641 |
| 2020/0156810 | A1 * | 5/2020 | Johnson | B64G 1/60 |
| 2021/0031953 | A1 * | 2/2021 | Johnson | B64G 1/646 |
| 2023/0382566 | A1 * | 11/2023 | Johnson | B64G 1/641 |
| 2024/0109675 | A1 * | 4/2024 | Wu | B64G 1/1081 |

OTHER PUBLICATIONS

Fehse, Wigbert. "Automated Rendezvous and Docking of Spacecraft." Cambridge Aerospace Series. 1st Edition. (Year: 2003).

McLaughlin, Richard, et al. "The Common Berthing Mechanism (CBM) for International Space Station." Society of Automotive Engineers. 2001. (Year: 2001).

Boeing, International Space Station Electrical Power System (EPS), 2006, 23 pages.

* cited by examiner

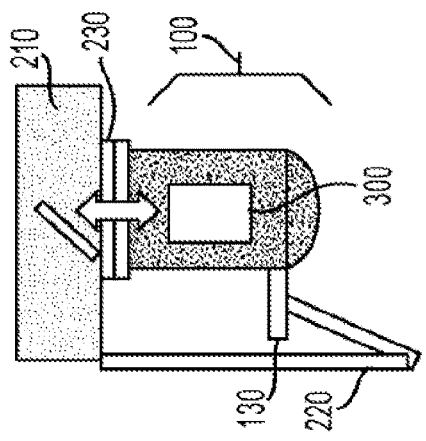
FIG. 9A
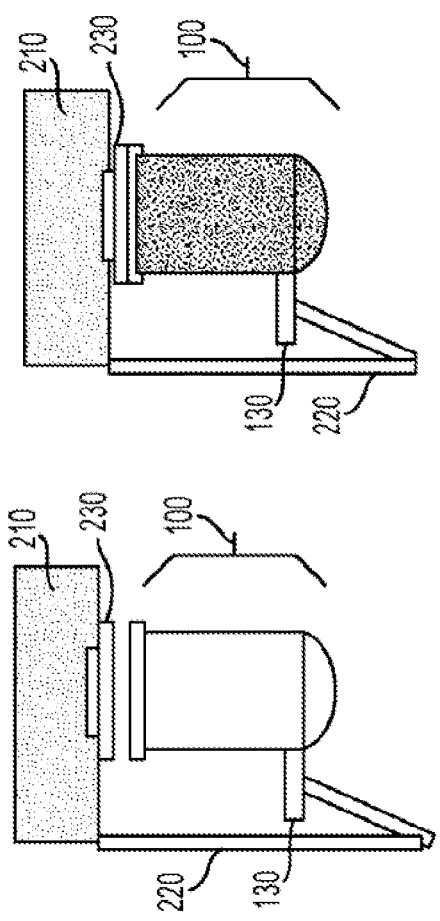
FIG. 9B
FIG. 9C
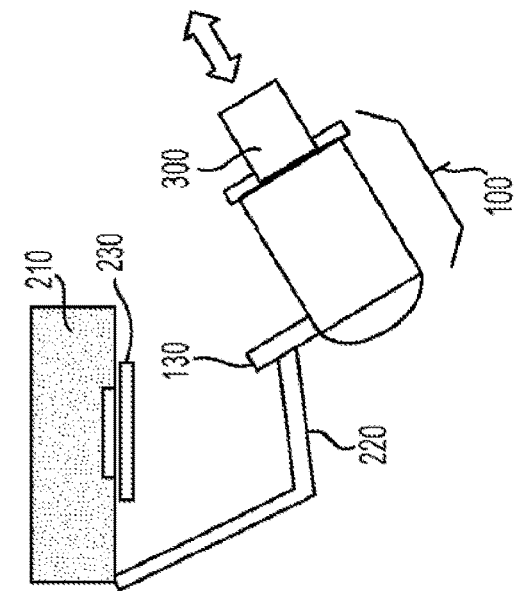
FIG. 9D
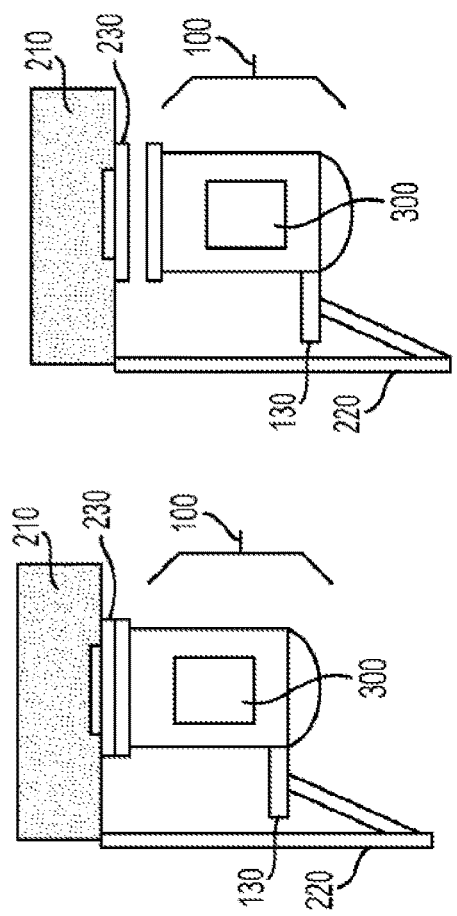
FIG. 9E
FIG. 9F

SPACECRAFT SYSTEMS AIRLOCK FOR INTERNATIONAL SPACE STATION ACCESS AND INTERFACE AND METHODS OF OPERATION

CROSS-REFERENCE TO RELATED APPLICATIONS

This application is a continuation of and claims the benefit of priority to U.S. application Ser. No. 17/062,103, filed on Oct. 2, 2020, which is a continuation of and claims the benefit of priority to U.S. Application Ser. No. 15/910,907, filed Mar. 2, 2018, which is a continuation of and claims the benefit of priority to U.S. application Ser. No. 15/264,238, filed Sep. 13, 2016, now U.S. Pat. No. 10,569,911, issued Feb. 25, 2020, which claims the benefit of priority to U.S. Provisional Application No. 62/218,427, filed Sep. 14, 2015, and U.S. Provisional Application No. 62/217,883, filed Sep. 13, 2015, all of which are hereby incorporated by reference in their entireties.

FIELD OF THE INVENTION

The present disclosure relates generally to a spacecraft airlock system configurable to utilize robotic operation as well as a system and apparatus for attaching space exposed payloads to a space station.

BACKGROUND OF THE INVENTION

Space station modules may be attached to each other utilizing various means. In particular, the International Space Station (ISS) utilizes Common Berthing Mechanisms (CBMs) consisting of a male (Active Common Berthing Mechanism or ACBM) and a female (Passive Common Berthing Mechanism or PCBM) portion that connect modules together and permit transfer of resources, cargo and crew between each module.

Payloads exposed to outer space (i.e. vacuum) conditions may be attached to a space station by a variety of means. In particular, the International Space Station utilizes Flight Releasable Attachment Mechanisms (FRAMs) consisting of a male (Active Flight Releasable Attachment Mechanism or AFRAM) and a female (Passive Flight Releasable Attachment Mechanism or PFRAM) portion that connects vacuum exposed payloads to the International Space Station and provides power, data line connectivity, and physical attachment of the vacuum exposed payload with the International Space Station.

In the case of the International Space Station, the FRAM sites are located far from the pressurized modules and have limited resources such as power and data lines and generally no thermal management system (e.g. active cooling loops) that are enjoyed by the pressurized modules. Accordingly, private companies have undertaken designing and building proprietary airlock to approach NASA with the idea, and the space agency officially has accepted the project.

There is a need to develop the airlock to launch on a NASA cargo mission and then be attached to a port on the station's Tranquility module. A hatch in place on the end of Tranquility that blocks the inside of the station from the vacuum of space. Astronauts may be able to open this hatch to place satellites or other research payloads inside the airlock. Once the payloads are inside, the airlock may depressurize and all the air may be pumped out. Then the station's Canadian robotic arm may detach the airlock from the ISS and extend it out into space. From here, satellites may be deployed into orbit or research experiments may be tested in the vacuum of space.

Demand for external payload sites has continued to grow as industry has responded to the extension of the ISS program life. For the past couple of years, industry has demonstrated a demand for external ISS payload services. The needed capacity is to handle expected future growth. The needed airlock mechanism would provide a significant expansion to the number of external payload sites available to the science and technology development communities. A minimum of seven (7) additional FRAM sites to be available for commercial payload or government use are needed.

Additional concepts have been discussed to further expand on the original seven sites if the demand continues to grow.

NASA and its station program supporters face the pleasant problem that the demand for ISS utilization may well come to exceed available opportunities. Yet, at the same time, there is the conundrum that the end date of the station may impede the further commercial investment required to allow utilization necessary for next steps in exploration and scientific discovery to grow. Looking out, there is a widely accepted desire among stakeholders to develop methods for better utilizing space station assets and engaging in public-private partnerships to best leverage resources for industry to take over low-Earth orbit operations once the ISS reaches its expiration date.

BRIEF SUMMARY OF THE INVENTION

In embodiments, the disclosure may provide an improved spacecraft airlock system, and in particular, a system and method for attaching a single hatch airlock robotically to a spacecraft.

In embodiments, an airlock may comprise a plurality of CBM sites. In embodiments, the airlock may be lightweight and simple in construction. In embodiments, the airlock may be moved between CBM locations and other locations without the utilization of an astronaut Extravehicular Activity (EVA or spacewalk) by using robotic means.

In embodiments, the disclosure may provide a system for attaching space exposed payloads to a space station and in particular a method and apparatus for attaching FRAM sites to a module containing a CBM.

In embodiments, CBM sites may be utilized as FRAM sites. In embodiments, FRAM sites may take advantage of the superior resources that are available to a CBM site such as, but not limited to, increased power, thermal cooling, and higher bandwidth data services. In embodiments, the FRAM sites may be moved to another CBM location without the utilization of an astronaut Extravehicular Activity (EVA or spacewalk). In embodiments, any number of FRAM sites may be added to a CBM site without interfering with the operation of the CBM site.

Embodiments provide a spacecraft airlock system. Embodiments provide a method and apparatus for attaching space exposed payloads to a space station. The spacecraft airlock system provides a defined volume of space payload to the international space station. The airlock further includes a means of attaching to a space station, a closed structure attached to said means, said means of attaching is capable of robotic manipulation, and a cooling system for cooling payload components within said closed structure.

BRIEF DESCRIPTION OF THE DRAWINGS

The novel features believed characteristic of the disclosed subject matter may be set forth in any claims that are filed now and/or later. The disclosed subject matter itself, however, further objectives, and advantages thereof, may best be understood by reference to the following detailed description of an illustrative embodiment when read in conjunction with the accompanying drawings, wherein:

FIGS. 9A through 9F show placement, use, and removal of the presently disclosed airlock mechanism through the assistance of the ISS grappling robot arm.

DETAILED DESCRIPTION OF ILLUSTRATIVE EMBODIMENTS

Reference now should be made to the drawings, in which the same reference numbers are used throughout the different figures to designate the same components.

It may be understood that, although the terms first, second, third, etc. may be used herein to describe various elements, these elements should not be limited by these terms. These terms are only used to distinguish one element from another element. Thus, a first element discussed below may be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It may be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
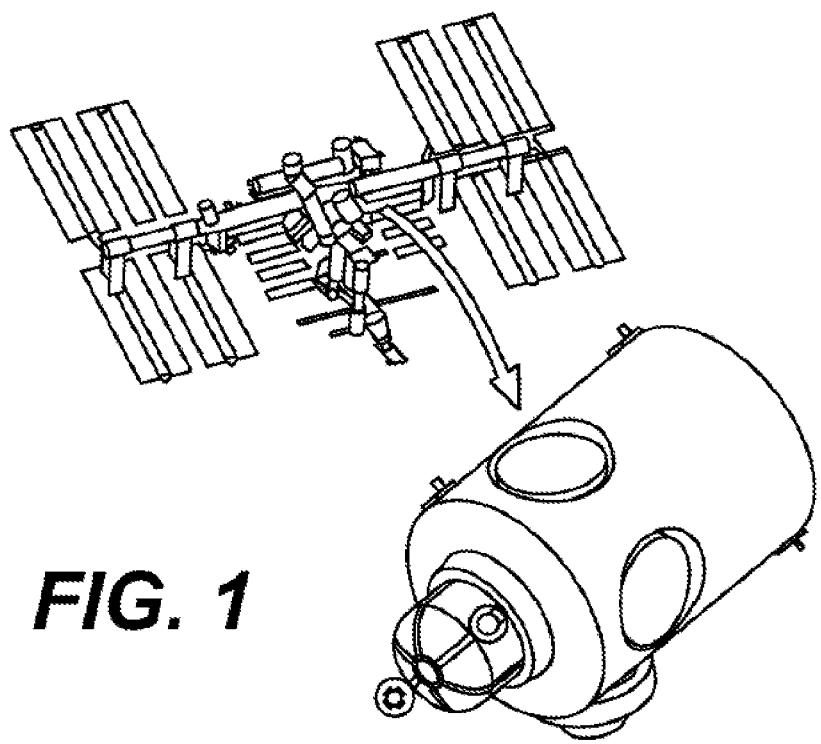
FIG. 1 displays the International Space Station (ISS) employing the subject matter of the present disclosure.

FIG. 1 displays the International Space Station (ISS) employing the subject matter of the present disclosure.

This airlock may have five times the volume of the Japanese airlock, so satellites the size of a refrigerator can potentially be deployed this way. It also allows deploying even more satellites at one time. "Instead of doing the microwave-sized satellites one at a time, we can do three or four of those at one time on one airlock cycle," says Howe.

The airlock also poses an opportunity for companies to do technology demonstrations in space. Companies looking to commercialize a space sensor or camera can test how their technologies hold up in lower Earth orbit. Restraints inside the airlock can hold down these technologies as they're exposed to the vacuum. "It's opening a door to space," says Howe. Once those technologies are flight-proven, the companies then have an easier time selling and marketing their hardware.

The airlock is just one of many commercial vehicles that are slowly making their way to the International Space Station. Currently, a private inflatable space habitat called BEAM—Bigelow Expandable Activity Module—is already attached to the Tranquility module, and astronauts have been periodically going inside it to see how it is holding up in space. Built by Bigelow Aerospace, BEAM has been performing well, and there are hints that the module may soon be used every day by the astronauts on the station. Building off of that success, NASA has said it may allow companies to attach their own habitat modules to the ISS in coming years.

This effort is all part of NASA's plan to turn the ISS into a commercial-friendly outpost, before eventually turning over the orbiting lab to the private sector in the mid-2020s. There is a need to use the space station to expose the commercial sector to new and novel uses of space, ultimately creating a new economy in low-Earth orbit for scientific research, technology development and human and cargo transportation.

To meet the growing demand for external payloads on the ISS, A commercial external payload facility that would operate using one of the berthing sites on Node 3. Such a facility meets one of the core strategic goals of NASA: providing stimulus to the U.S. economy through the creation of jobs via development of goods and services using the ISS platform as it opens up additional research and utilization by overcoming the capacity constraints of the existing external payload sites. The new facility, the FRAM Facility, or airlock mechanism, would provide a minimum of seven (7) new Flight Releasable Attachment Mechanism (FRAM)

sites for payloads, Orbital Replacement Units (ORUs) and other uses. These new sites may have full functionality with redundant power and high-speed data capabilities. These capabilities currently exist within the Node 3 and thus minimal reconfiguration of Node 3 is required to accommodate airlock mechanism.

It is envisioned that the airlock mechanism would be attached to the Node 3 Aft berthing ring. The airlock mechanism would be launched in a SpaceX Dragon trunk and then installed on Node 3 by the SSRMS. Astronauts would prepare and hook up the avionics via Intra-Vehicular Activity (IVA) and then ground control would manage power up and activation in a low risk manner. In all, the airlock mechanism installation requires no Extra-Vehicular Activities (EVAs) and is designed to minimize crew time by maximizing the ability of ground controllers to perform many of the activities. All payload installation and removals may be done solely via robotic operations and no Extra-Vehicular Activity (EVA) is required. The payload sites on airlock mechanism provide very good Nadir viewing from at least four sites. Zenith viewing is also fairly good with some partially obscured viewing. Other viewing directions are capable but much more limited. In addition, viewing may be improved by the payloads by providing angled or offset structures or active gimbaling or deployment of payload sensors.

The airlock mechanism also allows a stepping stone approach to commercial payload operations and utilization on and beyond the Space Station in accordance with NASA objectives. This sort of commercial investment, and team expertise, is vital to protect U.S. interests as government space station operations are set to be terminated in the mid-to-late-2020s.

In order to maximize the capabilities of these sites, all of the sites may have redundant 120 and 28 VDC power as well as wired Ethernet data connection to the ISS Joint Station LAN (JSL) and MIL 1553 interfaces. In addition, active cooling capability may be designed into the airlock mechanism systems using a Glycol type system that would interface to the Low Temperature Water Loop system within Node 3. This would be an optional service that would be implemented if the customer market would warrant such as a system.

In addition to the external sites, airlock mechanism has internal volume available ("125 ft3) for internal payloads or stowage. A very small amount of this interior volume may be utilized for the airlock mechanism core system avionics. The remainder may be utilized for a variety of purposes including temporary stowage of other ISS equipment and goods, additional science payloads or payload avionics that would interface to payload sensors mounted on the external FRAM sites. The interior may be outfitted with seat track that is identical to the internal seat track used elsewhere on the ISS thereby allowing for a very flexible configuration that is also compatible with existing ISS infrastructure and equipment.

The airlock mechanism may also work in conjunction with the present airlock to provide additional capability for payloads or ORUs to be transferred from inside the ISS to the outside and vice versa. This capability provides the additional benefit of payloads having a "soft" ride to orbit via internal stowage in ISS visiting vehicles or potential shirtsleeve environment repair by ISS crew for external payloads in the event of contingencies, failures or upgrades.

The airlock mechanism delivers additional use of space station resources for both commercial and government payloads. The additional capability may attract additional payloads and extend the utilization of the ISS as a National Laboratory. The additional sites may produce additional burden on ISS crew time and resources but the airlock mechanism is being designed to minimize crew time and rely heavily on automation and robotics. This reliance on automation and robotics is key to developing a proven infrastructure that may be sustainable after the ISS end of life. The disclosed airlock provides access to worldwide commercial payload customer base. This enables additional capability for future utilization of ISS and provides additional capacity for housing commercial payloads on ISS.

The airlock mechanism design evolved from the Lightweight Urthecast Alcove (LUNA) effort and the NASA communicated need for additional external payload FRAM sites. Originally LUNA was evaluated for the addition of two to three FRAM sites to its exterior to accommodate this need but when LUNA was cancelled, the focus shifted to an all FRAM site structure which then gave birth to the airlock mechanism.

Figure 2:
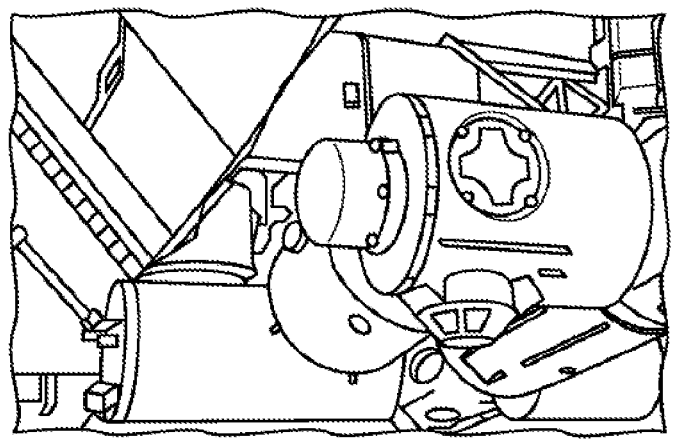
FIGS. 2 and 3 show a perspective view of the disclosed subject matter affixed to an ISS end module.
Figure 3:
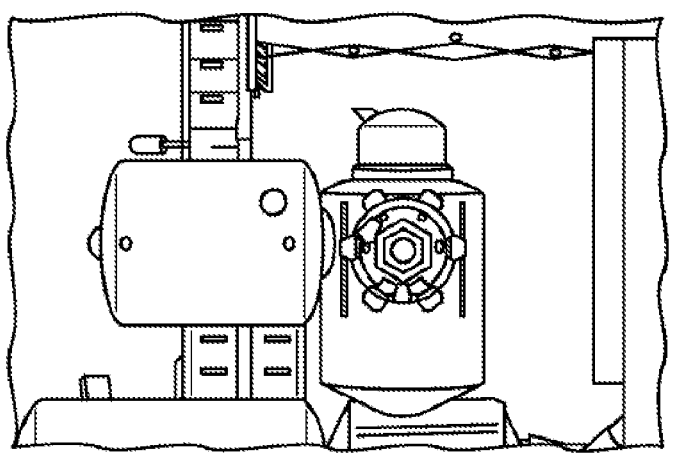

FIGS. 2 and 3 show a perspective view of the disclosed subject matter affixed to an ISS end module. The airlock of the present disclosure may be fabricated and installed within a Passive Common Berthing Mechanism, the doorway satellites pass through as they move from the pressurized environment of the ISS into space.

The new airlock is designed to accommodate customers who want to deploy satellites from the ISS that are too large for the current access route, Japan's Kibo airlock. Once the new airlock is installed, ISS astronauts also may be able to assemble payloads in orbit with component parts sent the station in cargo transfer bags, the statement said.

The airlock on the Kibo module is the only method for deploying small satellites from the station, and it is only opened five to 10 times a year. Some of those openings are reserved for NASA and the Japanese Aerospace Exploration Agency, which operates the airlock, while just a few openings are reserved for other users. This limited availability has created a backlog in deployments for the company.

Figure 4:
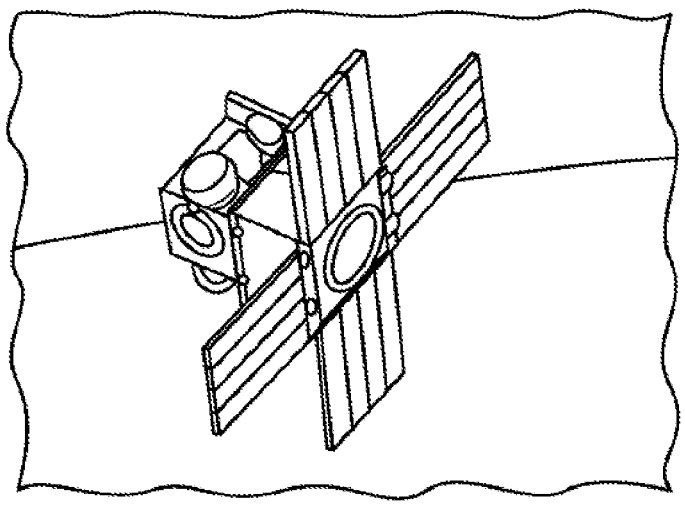
FIGS. 4, 5, and 6 depict exemplary use scenarios for the presently disclosed subject matter.
Figure 5:
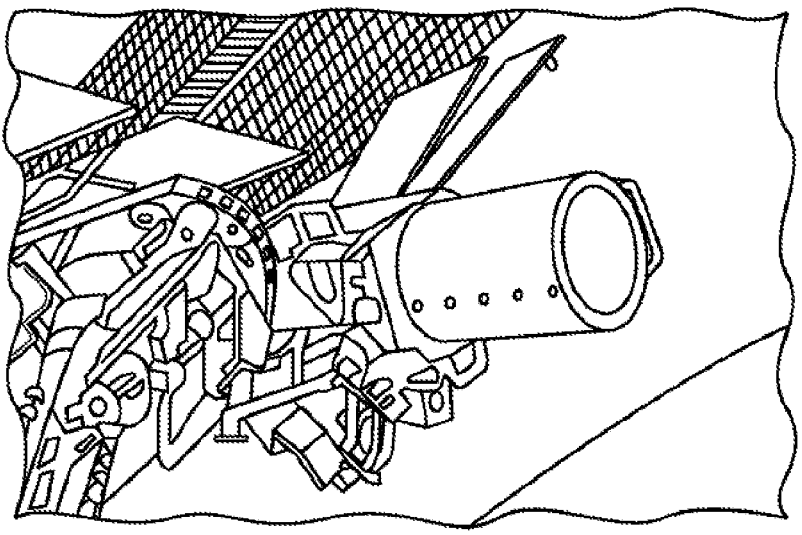
Figure 6:
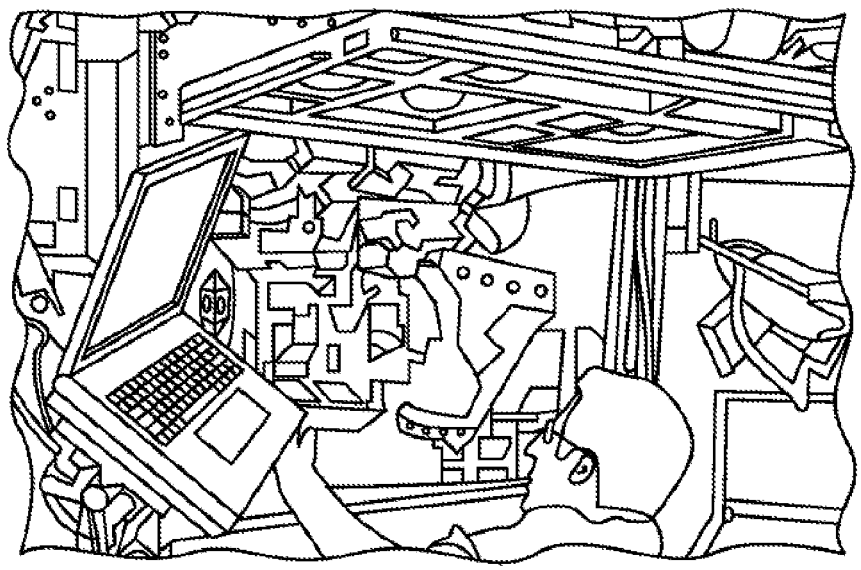

FIGS. 4, 5, and 6 depict exemplary use scenarios for the presently disclosed subject matter. Deployable: CubeSat or Small Satellite Deployments from ISS. External-Space Vacuum Exposure. Materials exposure or imaging type experiment. An additional feature airlock mechanism provides for potential payloads is the ability to have payload avionics located within the ISS pressurized area and thus only have the sensors mounted to the FRAM.

This frees up mass and volume on the FRAM plate. Provides lab type environment for avionics which is much more benign than an exterior environment. Avionics may ride up in soft stowage which is much more benign launch environment than when riding on the FRAM interface (would require simple crew installation on orbit). Avionics may be upgraded/repaired as needed by the crew. The airlock mechanism would be a natural extension of the current fleet of ISS facilities. All manifesting, ISS integration activities, safety, flight planning and operations would be undertaken by a team known to NASA and the Station Program.

Figure 7:
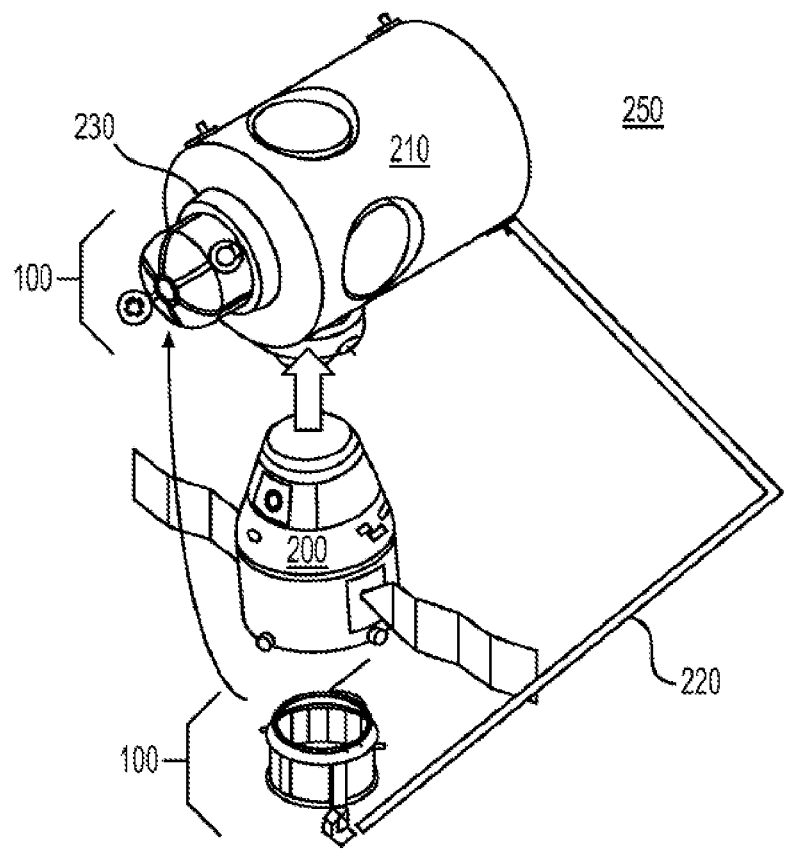
FIGS. 7 and 8 show use off an International Space Station grappling arm robot for placing the subject matter of the present disclosure with an International Space Station end module.
Figure 8:
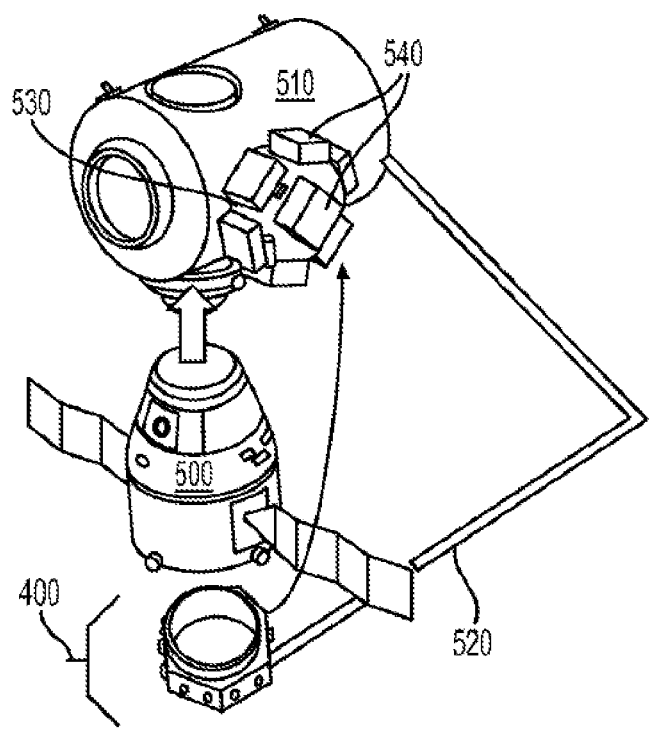

FIGS. 7 and 8 show use off an International Space Station grappling arm robot for placing the subject matter of the present disclosure with an International Space Station end module. FIG. 7 displays a spacecraft airlock system 250 in accordance with embodiments. End module 100 may be transported to orbit via a transportation vehicle 200 travelling to a space station 210 (such as the SpaceX Dragon). The end module 100 may be affixed to transportation vehicle 200 via the PCBM. Once the transportation vehicle 200 has berthed at the space station 210, the robotic grapple fixture 130 affixed to the module 100 may be grappled to a robotic arm 220 affixed to the space station 210. The robotic arm 220 may remove the end module 100 from the transportation vehicle 200 and move the end module 100 to a desired ACBM site 230 so that the end module 100 may be berthed on the ACBM site 230 found on the space station 210. A crew within the space station 210 may then pressurize module 100, open a hatch affixed to ACBM site 230, and transfer crew members and/or equipment to and from module 100. The module 100 may then be utilized as an airlock.

FIG. 8 displays a perspective view of the module 400 being removed from a transportation vehicle and affixed to a space station in accordance with embodiments. Module 400 may be transported to orbit via a space station visiting vehicle 500 (such as, but not limited to, SpaceX Dragon) and, once the visiting vehicle 500 has berthed at space station 510, module 400 may be grappled via robotic arm 520, removed from visiting vehicle 500, moved to the desired ACBM site 530, and berthed on the ACBM site 530 on space station 510. The space station crew may then open the hatch on the ACBM site 530 side and connect space station 210 utilities (e.g. electrical, data, coolant lines, etc.) to module 400. Module 400 may then be ready for use to mount AFRAM payloads 540 on module 400.

FIG. 8 further displays a perspective view of a module 400 including FRAM based payloads 540 and affixed to a space station 510 in accordance with embodiments. In embodiments, module 400 may be a PCBM 410/ACBM 530 version, wherein multiple modules 400 may be attached to each other without interfering with the continued operation of the CBM system. Other modules or visiting vehicles 200 may attach to the ACBM site 530 of the module stack at any time without interfering with the operation of the CBM system or FRAM based payload 540 installation or removal.

FIGS. 9A through 9F show placement, use, and removal of the presently disclosed airlock mechanism through the assistance of the ISS grappling robot arm. In depiction 9A, module 100 may be berthed on an ACBM site 230 on space station 210 using robotic arm 220. Depiction 9B shows module 100 being pressurized from air inside the space station 210. Depiction 9C shows equipment and or crew 300 being placed inside module 100. Depiction 9D shows an ACBM site 230 hatch being closed and module 100 being depressurized. Depiction 9E shows module 100 being removed from the ACBM site 230 on the space station 210 using robotic arm 220. Depiction 9F shows equipment and/or crew 300 being placed outside module 100. Additional equipment and/or crew 300 may then be placed inside module 100 for eventual transport into the space station 210. In embodiments, steps in the method may then be repeated after the placing of the equipment and/or crew 300.

Figure 10:
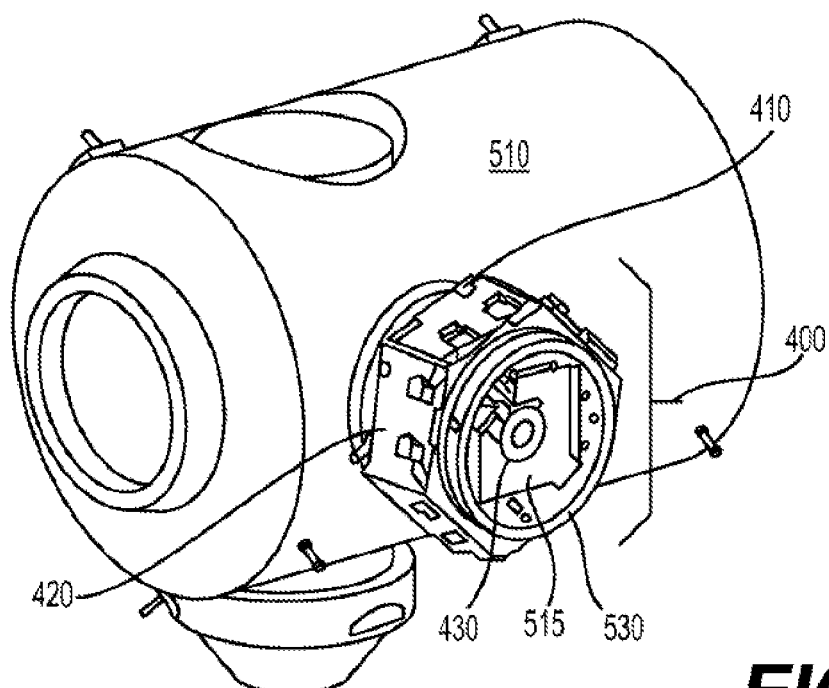
FIGS. 10 through 11 depict various uses of the presently disclosed subject matter in cooperation with a FRAM module.
Figure 11:
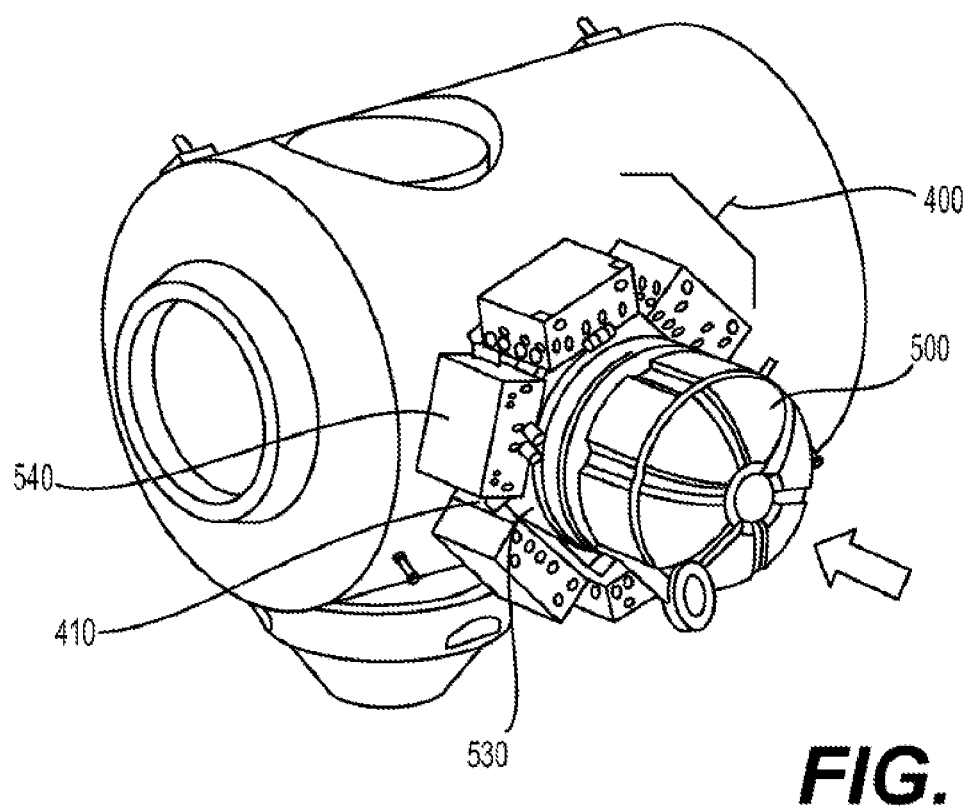

FIGS. 10 through 11 depict various uses of the presently disclosed subject matter in cooperation with a FRAM module. FIG. 10 displays a perspective view of a module 400 with an ACBM end being affixed to a space station in accordance with embodiments. Module 400 may comprise an open end 405 with a PCBM 410 that may attach to the space station 510 and an ACBM site 530 (with temporary hatch) on a second open end 515. Module 400 may comprise a six-sided cylindrical body with six PFRAM sites 430 located on each face around the periphery of the module. At least one robotic grapple fixture (e.g. a Flight Releasable Grapple Fixture or FRGF) may be located on the ACBM site 530 face to permit robotic manipulation of module 400.

Location of the airlock mechanism is currently targeted at the Node 3 Aft CBM location as it provides accessibility by the SSRMS for initial airlock mechanism installation as well as access to all FRAM sites. Per preliminary analysis, the site also is clear of ISS articulating and adjacent structures and robotic translation corridor.

The airlock mechanism is currently designed to fit within the SpaceX Dragon Trunk envelope as shown in FIG. 3. This is a key feature of airlock mechanism as one of the design goals is to maximize the external surface area of airlock mechanism in order to provide as much capability as possible for future commercial and government customers. In order to reutilize existing payload latch retention systems, airlock mechanism is planned to interface to the Dragon Trunk at six locations in the same manner as the BEAM payload. The current conservative weight estimate for airlock mechanism launch configuration is "2,800 lbs. (which includes a 25% margin) which is less than the BEAM weight of >3,000 lbs. All airlock mechanism structures may be designed for the launch and on-orbit load environments.

Upon successful berthing of Dragon to the Node 2 NADIR port, the SSRMS would be utilized to remove airlock mechanism from the Dragon Trunk and translate it to Node 3 Aft CBM for berthing. A preliminary robotics assessment has been completed showing removal from the Dragon trunk, maneuver to Node 3 Aft, and berthing is feasible via ISS robotics. FIG. 4 shows airlock mechanism in the Dragon Trunk with the SSRMS Approach Envelope showing clearance to the trunk.

A Centerline Camera Berthing System (CBCS) target located on airlock mechanism would be utilized to facilitate berthing operations. Once berthed, airlock mechanism would be pressurized using ISS atmospheric resources and the Node 3 Aft hatch opened. Note that there is no planned hatch located on the airlock mechanism side of the interface to simplify the structures and operations. Once opened, the ISS power, data, and ventilation interfaces would be connected by the crew and the airlock mechanism systems would be powered up and commissioned by ground controllers. Once commissioned, the airlock mechanism would be ready for payload operations. The airlock mechanism installation and commissioning is a short duration process and may be accomplished in one to two days from Dragon Trunk extraction to commissioning complete. No EVAs are required for the installation and IVA crew time is kept to a minimum by designing systems that are controlled primarily from the ground.

Figure 12A:
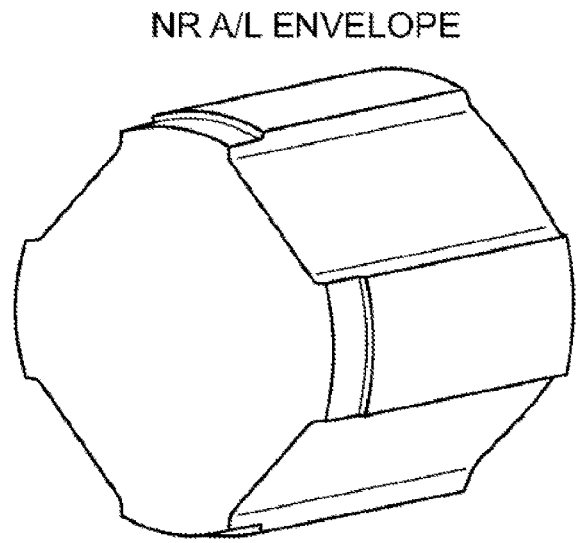
FIGS. 12A and 12B demonstrate volumetric improvements provided through the airlock mechanism of the present disclosure.
Figure 12B:
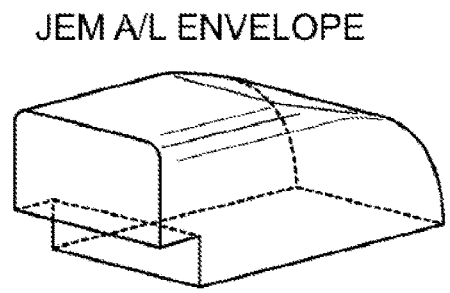

FIGS. 12A and 12B demonstrate the volumetric improvements provided through the airlock mechanism of the present disclosure. The volumetric improvement of the airlock of FIG. 12A offers significantly increase space relative to the known JEM airlock of FIG. 12B.

Figure 13A:
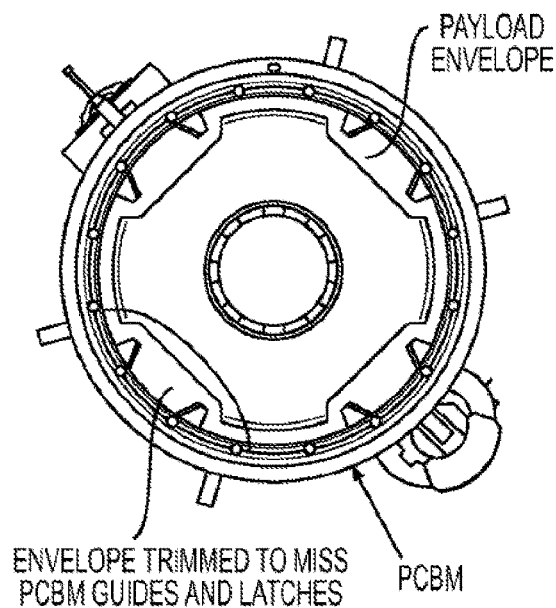
FIGS. 13A and 13B show volumetric considerations provided through the airlock mechanism of the presently disclosed subject matter.
Figure 13B:
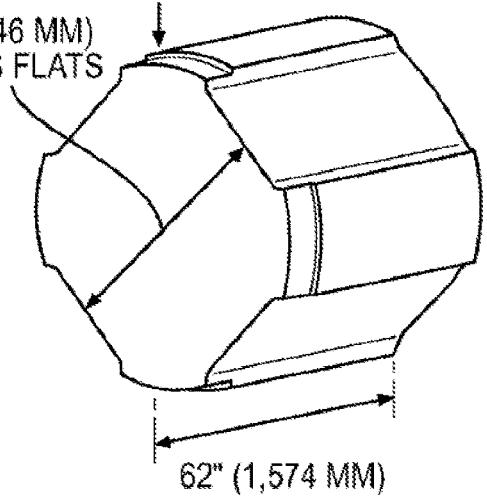

FIGS. 13A and 13B further show the volumetric considerations of the presently disclosed subject matter, which includes accommodation of an enveloped trimmed to is PCBM guides and latches. In the disclosed embodiment, a maximum diameter of 65 inches is trimmed with recesses causing a reduced diameter of 53 inches, which may cause the contents to not impact the PCBM guides and latches. With a depth of 62 inches, the airlock mechanism offers a significant multiple of the earlier JEM airlock envelope.

Figure 14:
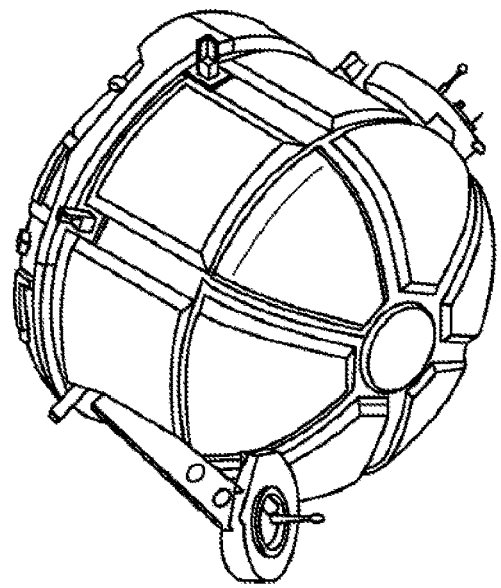
FIGS. 14 and 15 an installed and equipped airlock structure according to the presently disclosed subject matter.
Figure 15:
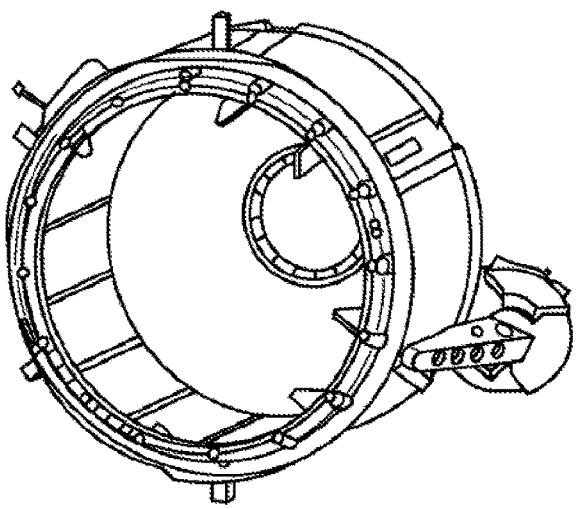

FIGS. 14 and 15 an installed and equipped airlock structure according to the presently disclosed subject matter.

Figure 16:
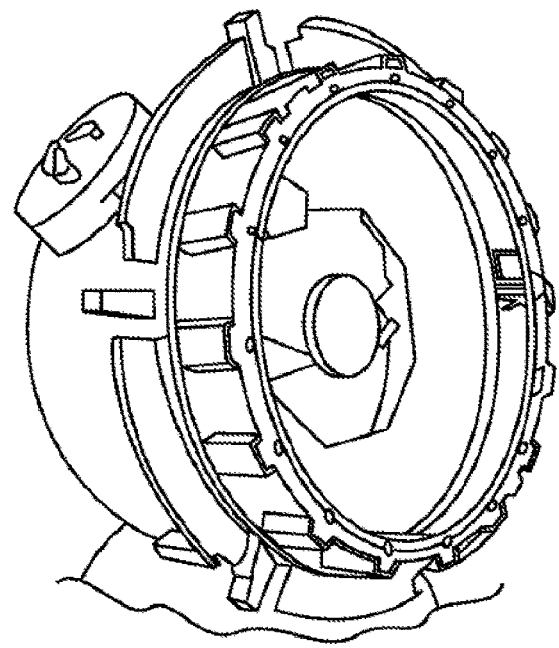
FIG. 16 shows various dimensional aspects of the presently disclosed subject matter for accommodating volume requirements of PCBM guides and latches.

FIG. 16 shows various dimensional aspects of the presently disclosed subject matter for accommodating volume requirements of PCBM guides and latches.

Figure 17:
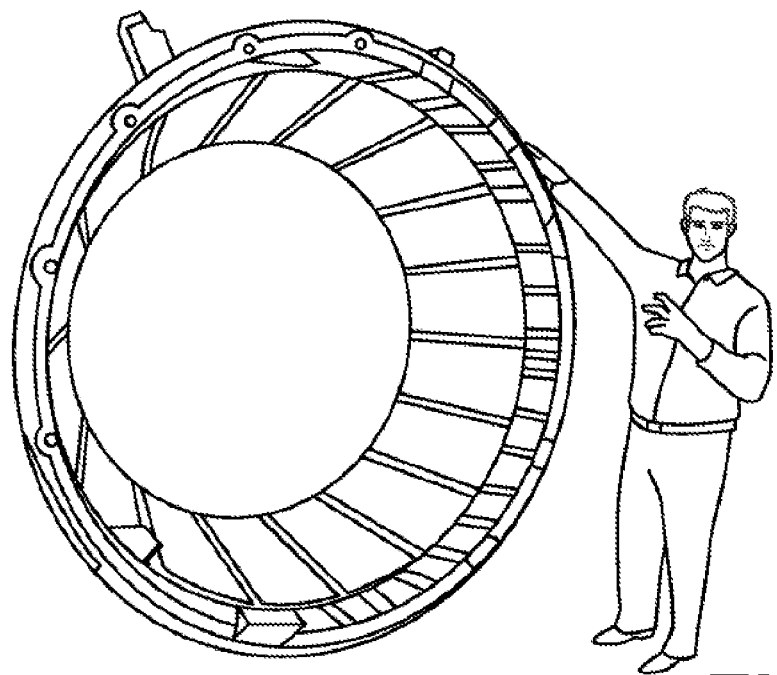
FIG. 17 shows the relative size of the airlock of the present subject matter in comparison with a normally sized individual.

FIG. 17 shows the relative size of the airlock of the present subject matter in comparison with a normally sized individual.

Figure 18:
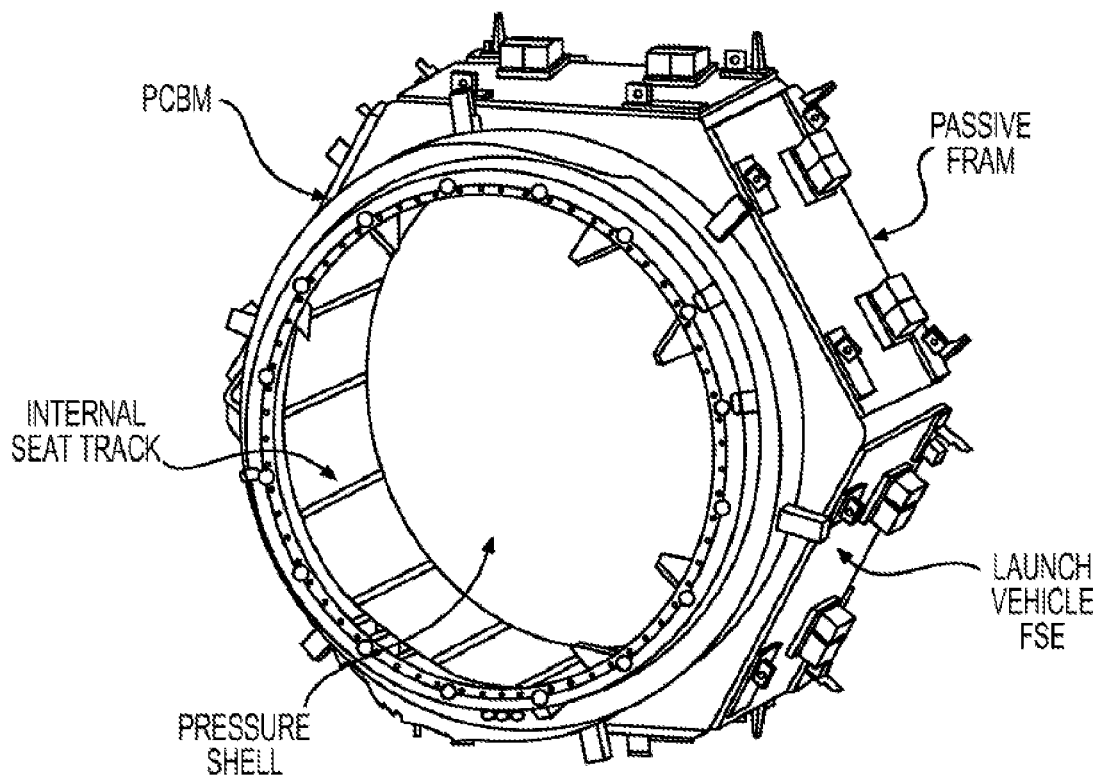
FIG. 18 shows a perspective view of the presently disclosed airlock mechanism for a pressure shell type structure equipped with a Passive Common Berthing Mechanism (PCMB). B. Technical Approach and Methodology

FIG. 18 shows a perspective view of the presently disclosed airlock mechanism for a pressure shell type structure equipped with a Passive Common Berthing Mechanism (PCMB). The airlock mechanism (see FIG. 1) is a pressure shell type structure equipped with a Passive Common Berthing Mechanism (PCBM) allowing attachment to and removal from the ISS. The airlock mechanism is also equipped with a Flight Releasable Grapple Fixture (FRGF) to allow for robotic manipulation using the Space Station Remote Manipulator System (SSRMS). Launch support Flight Support Equipment (FSE) may provide the interface to the SpaceX Dragon Trunk.

Figure 19:
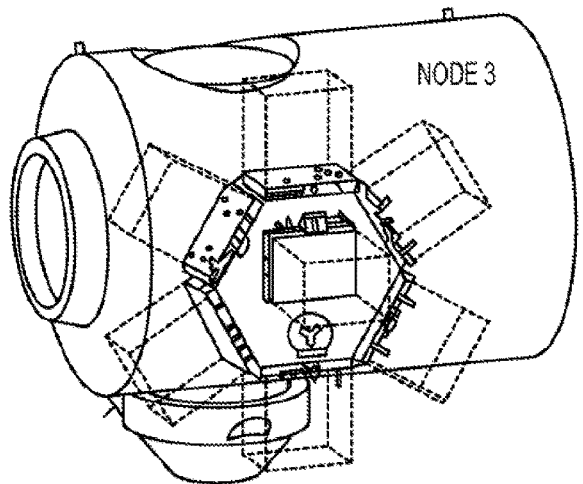
FIGS. 19 through 21 show aspects of the presently disclosed subject matter portraying use for exemplary payloads.
Figure 20:
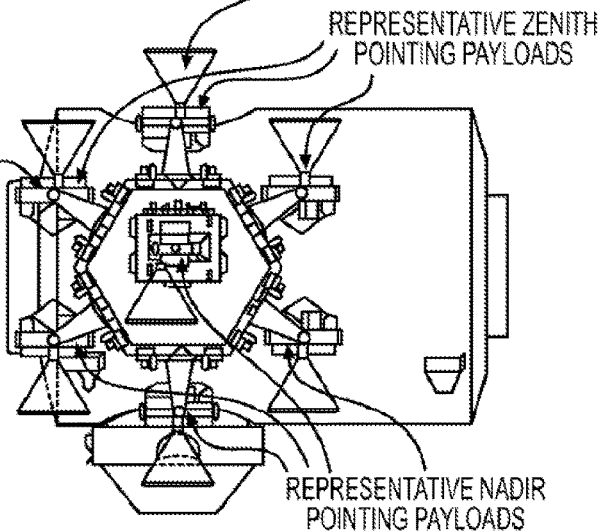
Figure 21:
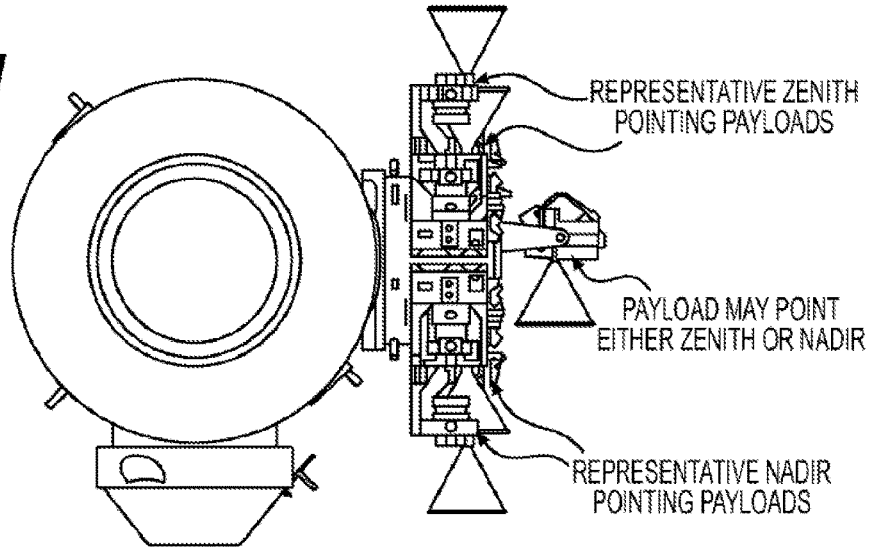
Figure 22:
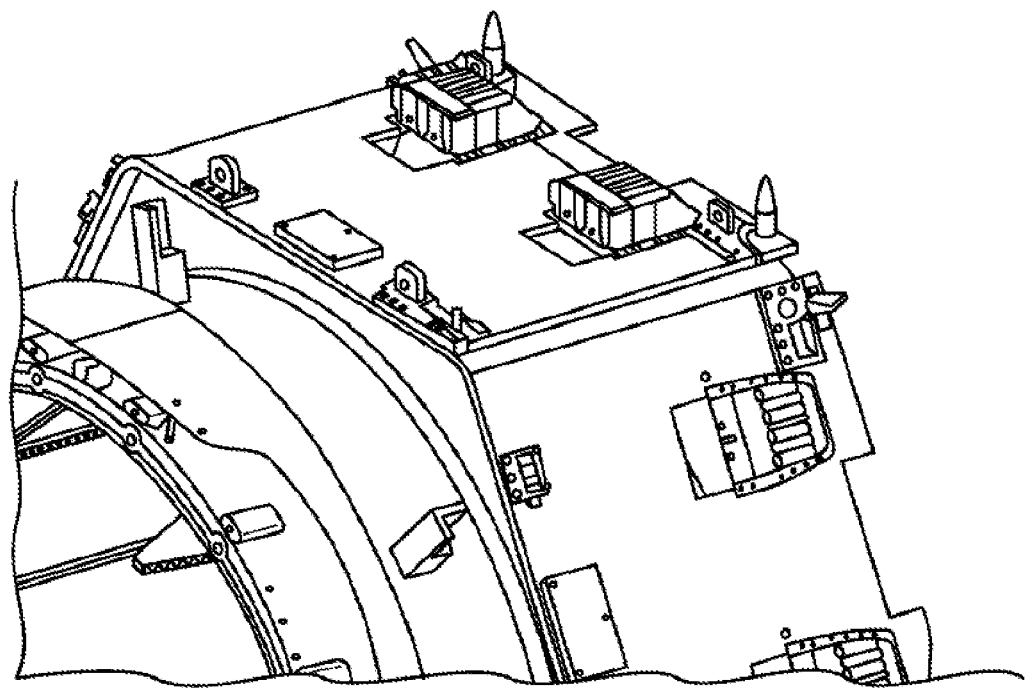
FIGS. 22 through 25 depict use of the airlock exterior for cooling system for providing enhanced functionality above and beyond the normal FRAM capabilities of the disclosed subject matter.
Figure 23:
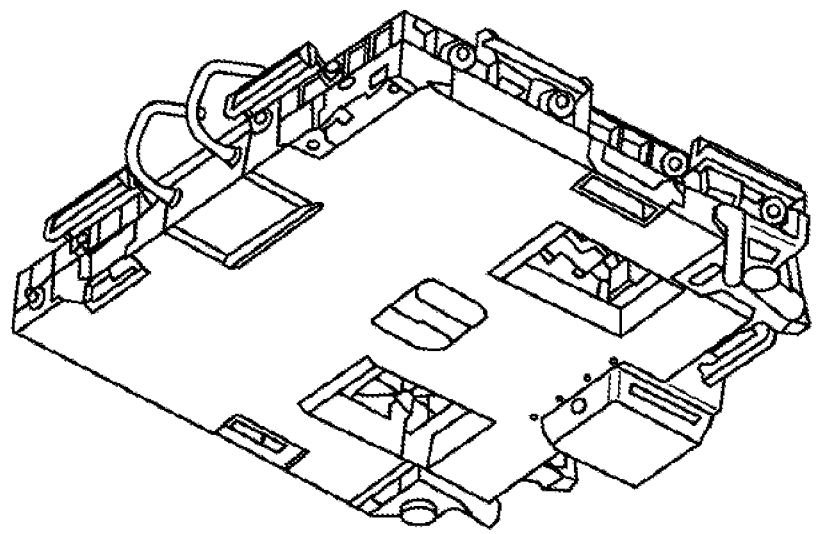
Figure 24:
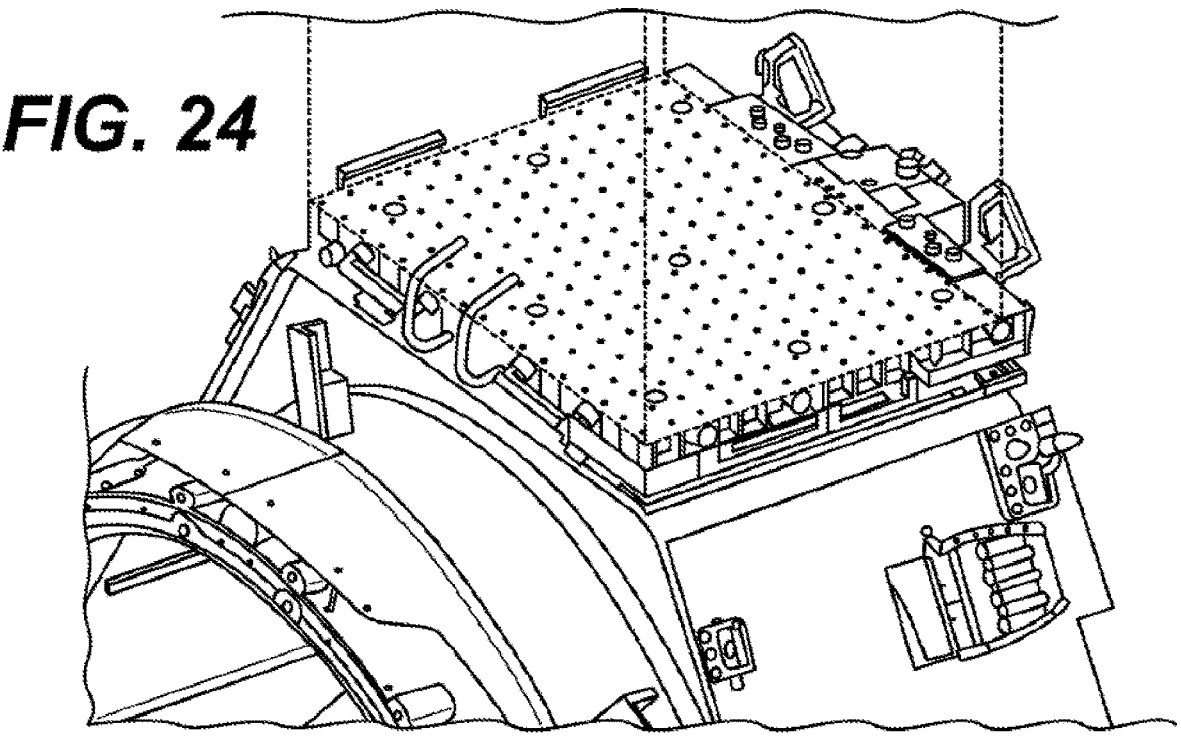

FIGS. 19 through 21 show aspects of the presently disclosed subject matter portraying use for exemplary payloads. An external wireless data interface may be considered for airlock mechanism but the wired interface provides a far superior data capability than the current ISS wireless system and thus is the baselined configuration for airlock mechanism.

The needed airlock mechanism would enhance two vital areas of NASA interest. The first is continued utilization of the ISS for commercial payloads via commercial investment by providing additional external payload capability. Commercial payloads include, but are not limited to earth viewing sensors, space viewing telescopes, and materials exposure experiments. The payload sites on airlock mechanism provide very good Nadir viewing from at least four sites. Zenith viewing is also fairly good with some partially obscured viewing. Other viewing directions are capable but much more limited. In addition, viewing may be improved by the payloads by providing angled or offset structures or active gimbaling or deployment of payload sensors.

FIGS. 22 through 25 depict use of the airlock exterior for cooling system for providing enhanced functionality above and beyond the normal FRAM capabilities of the disclosed subject matter.

Figure 25:
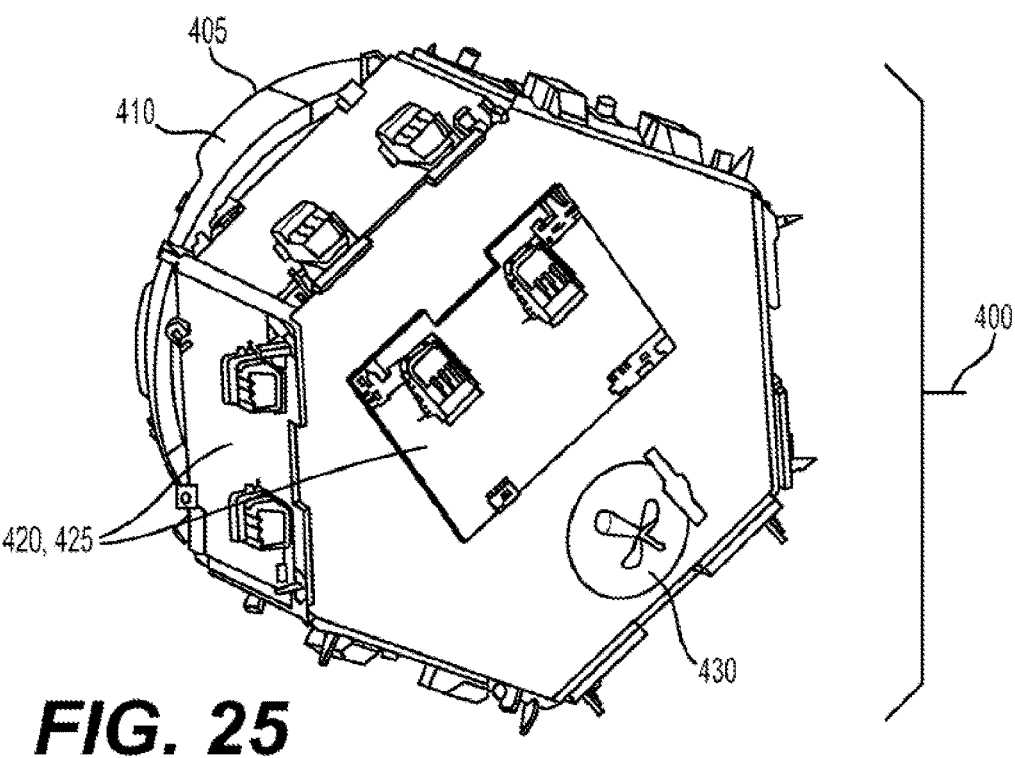

FIG. 25 displays a perspective view of a module with a closed end in accordance with embodiments. The closed end module includes a PCBM comprising an open end that may attach to a space station. The module may comprise a six-sided cylindrical body including six PFRAM sites located on each face and a seventh PFRAM site located on an end face opposite the PCBM of module. At least one robotic grapple fixture (e.g. a Flight Releasable Grapple Fixture or FRGF) may be located on the end face to permit robotic manipulation of module.

FIGS. 22 through 25 demonstrate volumetric capacity aspects of the presently disclosed airlock system. A cooling system is also a possibility for the airlock mechanism which would add a unique capability above and beyond the normal FRAM capabilities. The present disclosure this cooling system to utilize the Low Temperature Loop (LTL) of the ISS which would cool a Glycol loop via a heat exchanger which in turn would the cooling medium for the payloads mounted on the FRAMs. The Glycol loop would not exchange fluid with the FRAM or payload but rather would interface with a block of material mounted on the passive FRAM and then conductively cool a matching interface on the payload/FRAM. This system is illustrated in FIG. 6.

Monitoring of the airlock mechanism systems may be performed by operations team working with the ISS Payload Operations Interface Facility (POIF) and Mission Control Center Houston (MCC-H). It is envisioned that airlock mechanism would remain onboard for the remaining life of ISS including use in post ISS plans.

Plumbed into the airlock cooling system is a fluid-cooling heat sink mounted to the underside of a FRAM adapter plate in lieu of the third electrical connector housing. When the FRAM is mated to PFRAM, physical contact provides a conductive thermal path. The PFIP is equipped with a heat sink, plumbed into the airlock mechanism's glycol cooling loop.

Figure 26:
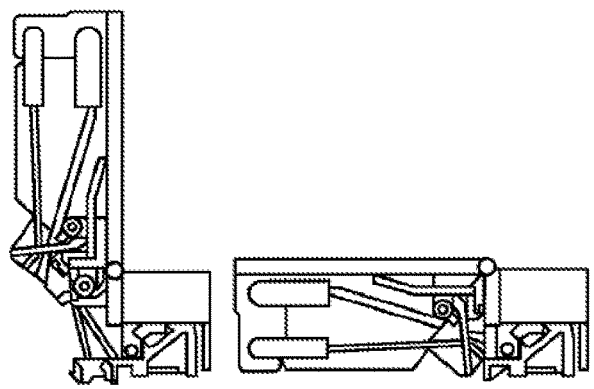
FIGS. 26 through 28 illustrate fold-down features for enhancing clearance within the presently disclosed subject matter.
Figure 27:
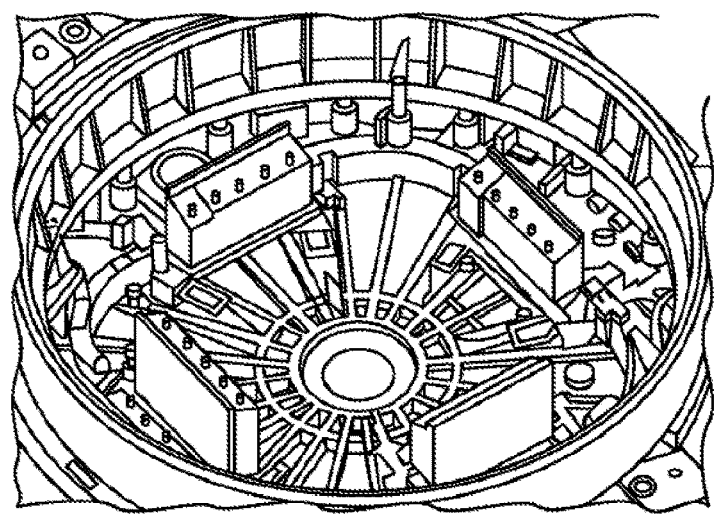
Figure 28:
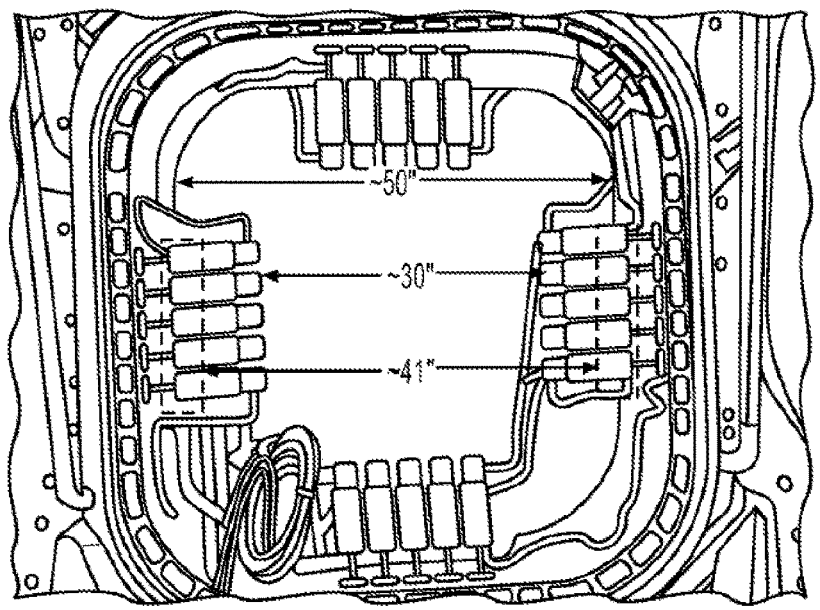
Figure 29:
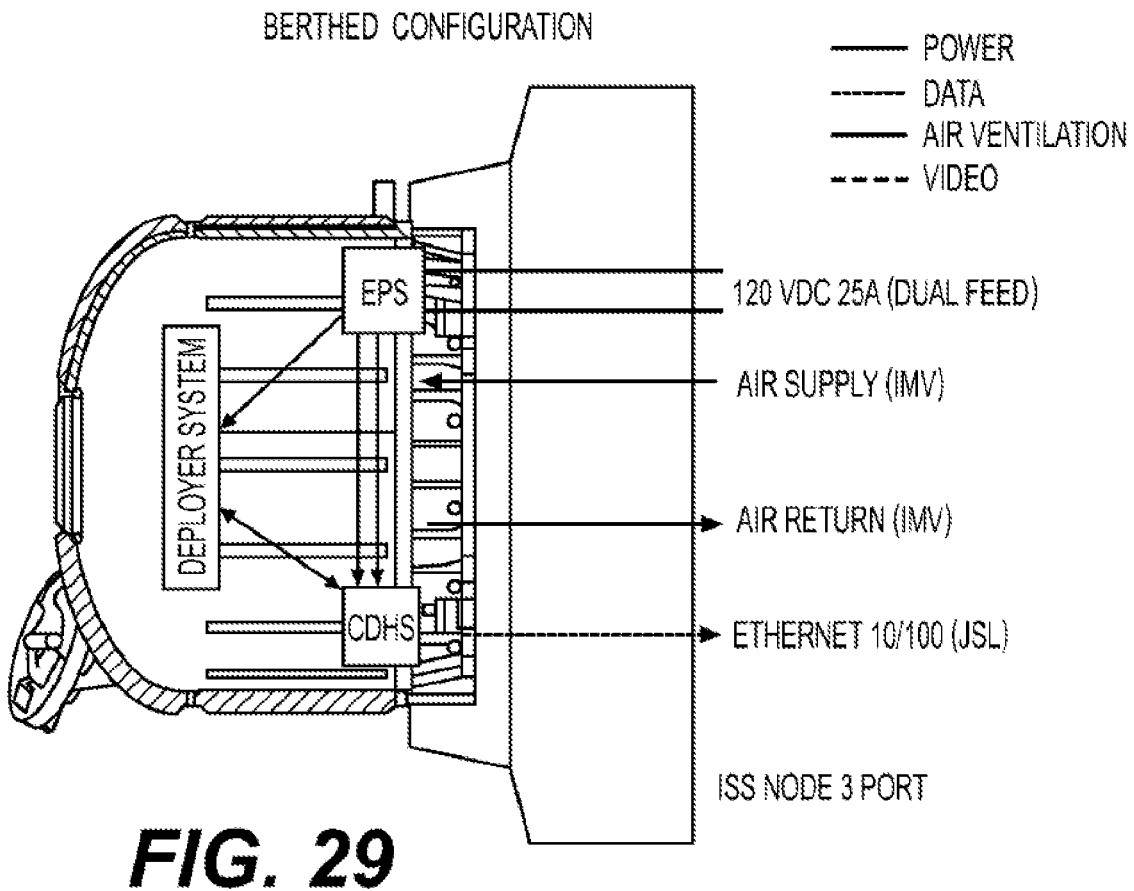
FIGS. 29 and 30, respectively, present a berthed and a deployed configuration of the presently disclosed airlock.
Figure 30:
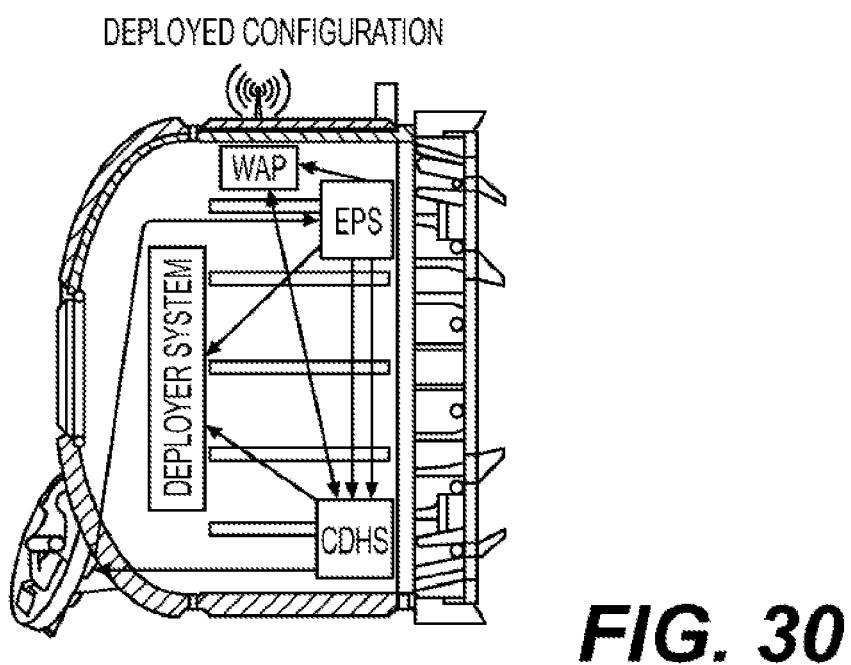

FIGS. 26 through 28 illustrate fold-down features for enhancing clearance within the presently disclosed subject matter. For installation of payloads in airlock, they must pass through the CBM hatch. The CBM Controller Panel Assemblies (CPAs) may be mounted on a fold down mechanism which restricts the opening to 41" square. Note: CBM CPAs without the fold down mechanism further restricts clearance to 30". Note: Full hatch opening: 50" square FIGS. 29 and 30, respectively, present a berthed and a deployed configuration of the presently disclosed airlock.

Figure 31:
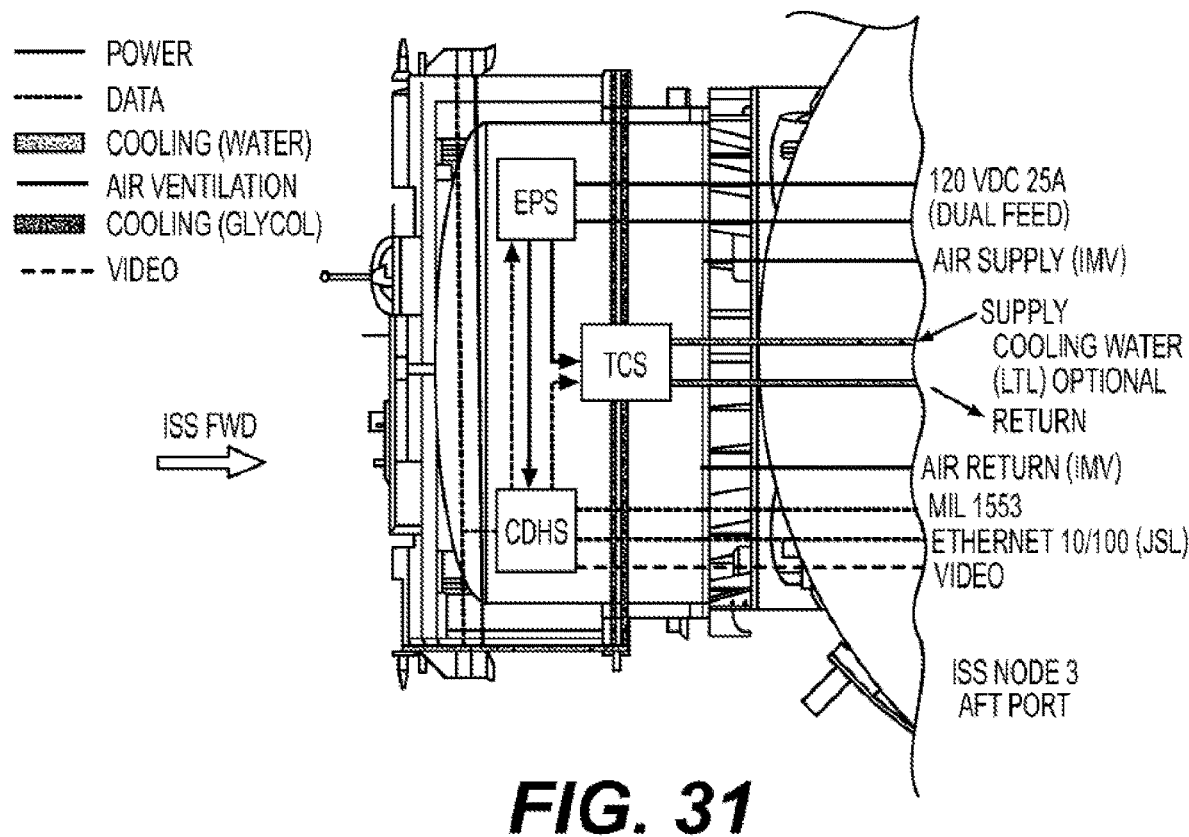
FIG. 31 shows a FRAM system and interfaces applicable to the presently disclosed subject matter.
Figure 32A:
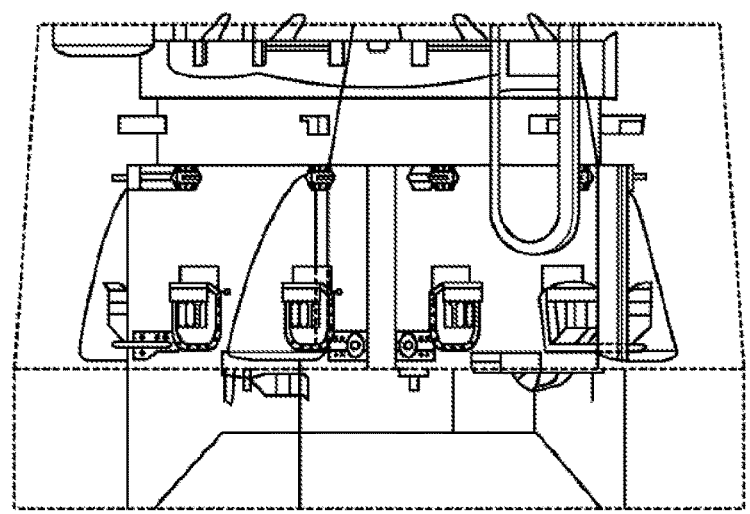
FIGS. 32A, 32B, 33, and 34 present engineering considerations for conveying the disclosed subject matter aboard a SpaceX Dragon payload.
Figure 32B:
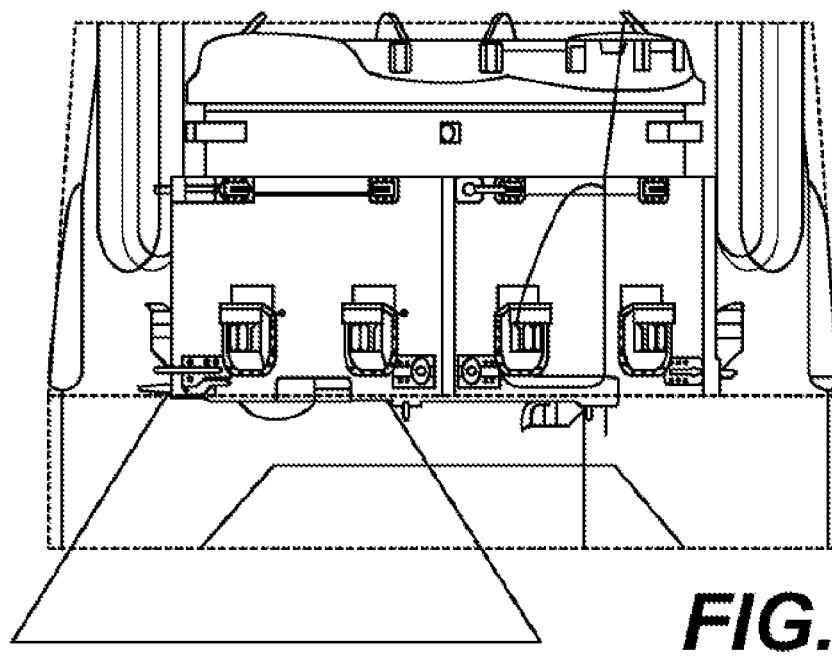
Figure 33:
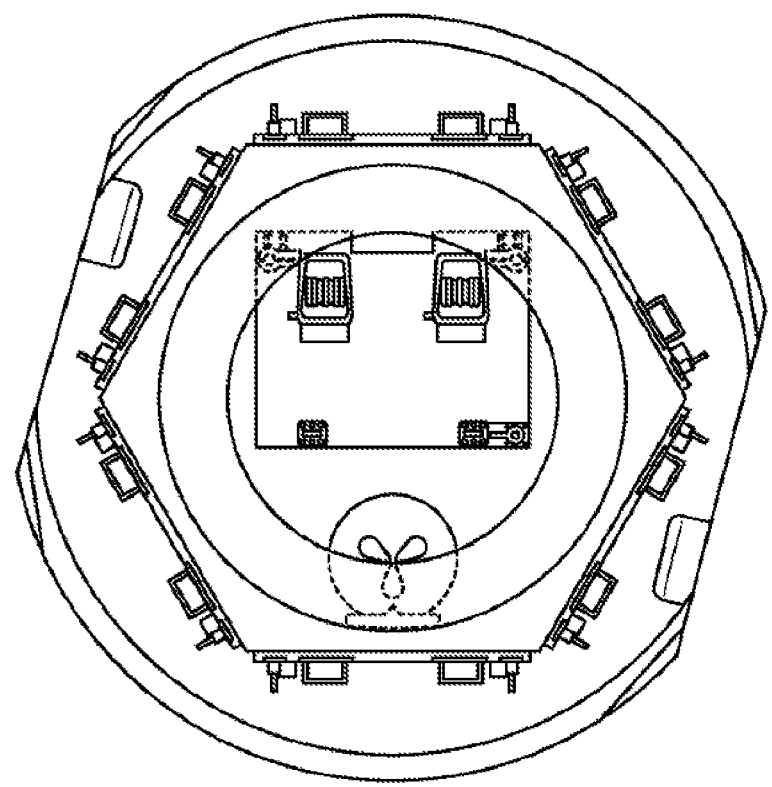
Figure 34:
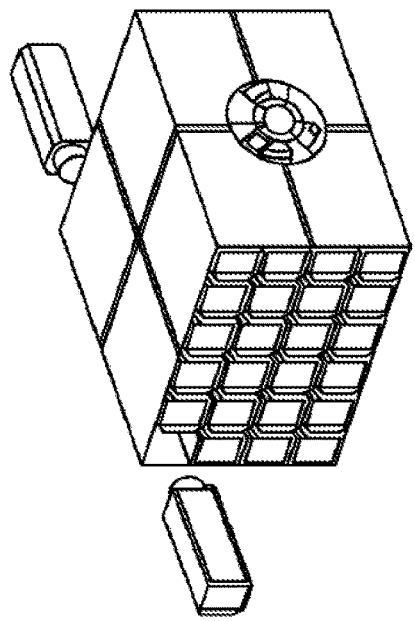
Figure 37:
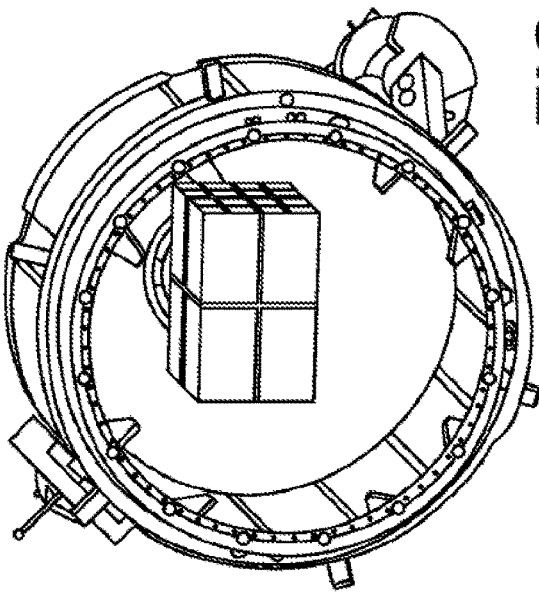
FIGS. 35 through 38 show use of the presently disclosed subject matter for microsatellite deployment.
Figure 35:
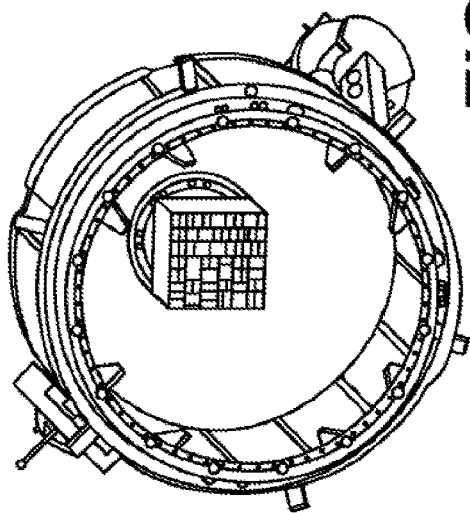
Figure 36:
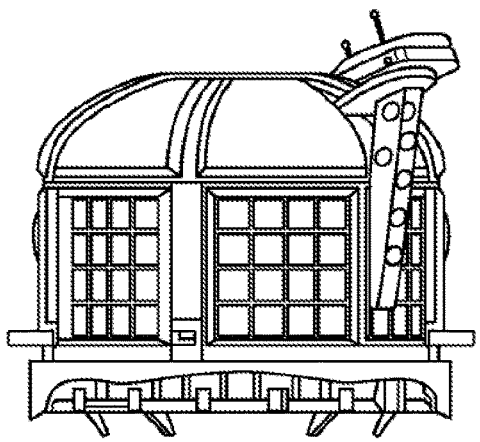
Figure 40:
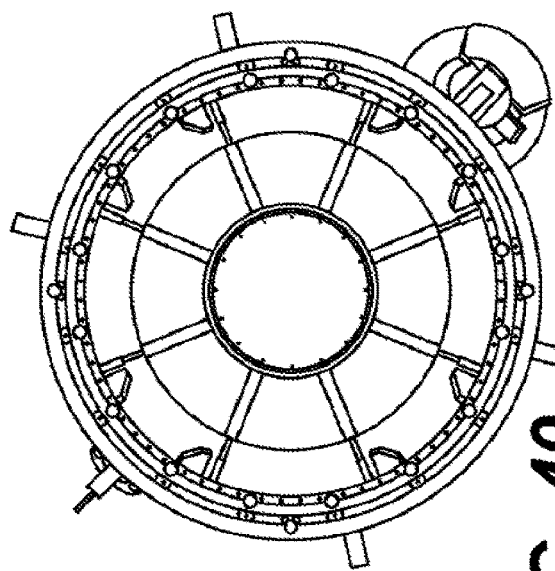
FIGS. 39 through 41 depict alternative uses for the airlock mechanism of the present disclosure to achieve important ISS and related objectives.
Figure 41:
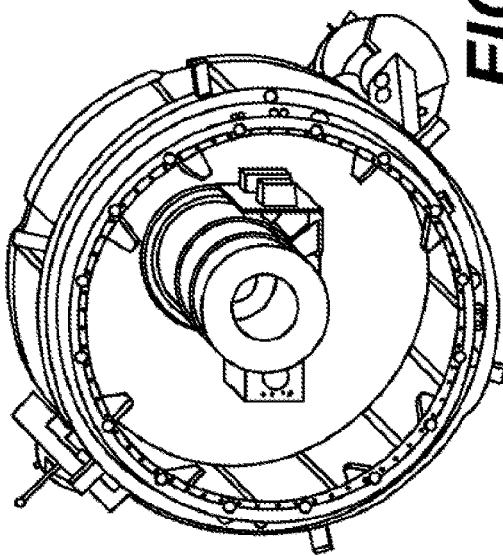
Figure 38:
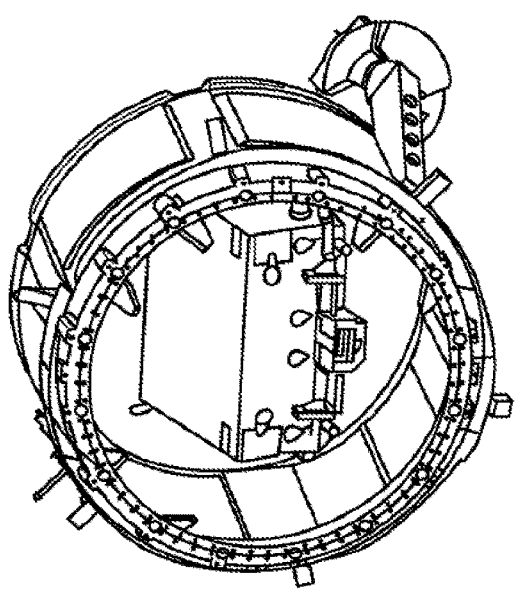
Figure 39:
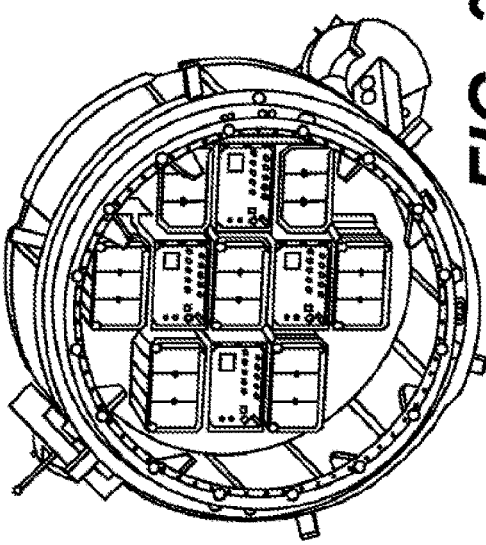

FIG. 31 shows a FRAM system and interfaces applicable to the presently disclosed subject matter. All payloads are planned to be installed via ISS robotics using the proven FRAM interface system. Therefore, all electrical mates may be done robotically as well. Preliminary robotics studies show that all sites are reachable by ISS robotics. The airlock mechanism Video System may provide visual assistance to the ISS robotics operator for payload installation and removal. This video may be available to crew and the ground as needed.

The airlock mechanism avionics may provide the command and control interfaces to the payloads and the interfaces to Node 3 as shown in FIG. 31. Power distribution may be via the airlock mechanism Electrical Power System (EPS) which may provide power control, isolation, circuit protection, and regulation to all the payloads. Redundant 120 and 28 VDC power may be available at all FRAM sites. The airlock mechanism Command and Data Handling System (CDHS) may provide the command and control of the payloads. The primary command and data path for the payload operations may be via the Ethernet interface. Safety critical command and data may be via the MIL 1553 interface if needed. The CDHS may also provide data storage capabilities as well if needed by the payload.

FIGS. 32A, 32B, 33, and 34 present engineering considerations for conveying the disclosed subject matter aboard a SpaceX Dragon payload.

FIGS. 35 through 38 show use of the presently disclosed subject matter for microsatellite deployment. The airlock appears with a small sat for deployment. This configuration may multiple KABER class payloads on one airlock.

FIGS. 39 through 42 depict alternative uses for the airlock mechanism of the present disclosure to achieve important ISS and related objectives.

The presently disclosed subject matter supports internal payloads, including "typical rack/locker" type internal payloads. Providing interfaces similar to ISS racks, there is provided power via ISS Node 3. 120 or 28 VDC from airlock EPS. Data via wired Ethernet to ISS Node 3, Ethernet through airlock CDHS, Data storage available on airlock CDHS too. Examples of such internal payloads may include (a) locker payloads, (b) glove Box payloads. (c) frame payloads The presently disclosed subject matter supports external payloads. Such payloads provide short duration exposure and very flexible position via SSRMS, including Nadir, Zenith, Ram, Wake, etc. These may be installed on the POA if SSRMS needed elsewhere. They must balance length of exposure with increased risk of MMOD hit at Node 3 Port CBM location.

Long Duration Exposure: airlock utilized to transfer payload outside of ISS for subsequent transfer to another ISS location (e.g., truss FRAM site). airlock parking on POA which then frees SSRMS to grapple and extract payload from within airlock.

NASA and its supporters face the pleasant problem that the demand for ISS utilization may well come to exceed available opportunities. Yet, at the same time, there is the conundrum that the end date of the station may impede the further commercial investment required to allow utilization to grow. Looking out, there is a widely accepted desire among stakeholders to develop methods for better utilizing space station assets and engaging in public-private partnerships to best leverage resources for industry to take over low-Earth orbit operations once the ISS reaches its expiration date.

The FRAM Facility delivers additional use of space station resources for both commercial and government payloads. The additional capability may attract additional payloads and extend the utilization of the ISS as a National Laboratory. The additional sites may produce additional burden on ISS crew time and resources but the airlock mechanism is being designed to minimize crew time and rely heavily on automation and robotics. This reliance on automation and robotics is key to developing a proven infrastructure that may be sustainable after the ISS end of life.

Furthermore, the airlock mechanism allows a stepping stone approach to operations and utilization on and beyond the Space Station in accordance with NASA objectives. The airlock mechanism may be designed, manufactured, operated and its services marketed by an industry team. This sort of commercial investment, and team expertise, is vital to protect U.S. interests as government space station operations are set to be terminated in the mid to late 2020s. In leading the commercial airlock mechanism team, there is the need to aid in helping to prevent a gap in low Earth orbit activities that may be detrimental to current ISS suppliers and users.

An additional feature, airlock mechanism provides for potential payloads is the ability to have payload avionics located within the ISS pressurized area and thus only have the sensors mounted to the FRAM. This provides the following advantages not afforded to other "typical" FRAM locations:

The presently disclosed subject matter frees up mass and volume on the FRAM plate. This provides lab type environment for avionics which is much more benign than an exterior environment. Avionics may ride up in soft stowage which is much more benign launch environment than when riding on the FRAM interface (would require simple crew installation on orbit). Avionics may be upgraded/repaired as needed by the crew.

In addition, the present disclosure possible NASA use for ORU storage and having full power and data resources available at each site provides enhanced capabilities over many of the other FRAM sites on the ISS.

While this disclosure has been particularly shown and described with reference to preferred embodiments thereof and to the accompanying drawings, it may be understood by those skilled in the art that various changes in form and details may be made therein without departing from the spirit of this disclosure. Therefore, the scope of the disclosure is defined not by the detailed description but by the appended claims.

We claim:

1. A spacecraft airlock, comprising:
    a module defining an interior with an open end, and including:
        a closed end opposite the open end of the interior;
        a passive common berthing mechanism positioned around the open end, such that the interior is configured to receive pressurized air from an active common berthing mechanism in a berthed configuration with the passive common berthing mechanism;
        an exterior surface having at least one attachment mechanism configured to releasably attach one or more vacuum exposed payloads to the exterior surface, wherein the exterior surface is a longitudinal surface between the open end and the closed end; and
        an Electrical Power System (EPS) that includes a dual feed power supply configured to interface with a power supply output of the active common berthing mechanism in the berthed configuration, and that is configured to provide one or more of power control, isolation, circuit protection, or regulation to any vacuum exposed payloads releasably attached to the at least one attachment mechanism of the exterior surface.

2. The spacecraft airlock of claim 1, further comprising:
    a Command and Data Handling System (CDHS) configured to command and control any vacuum exposed payloads releasably attached to the at least one attachment mechanism of the exterior surface.

3. The spacecraft airlock of claim 2, wherein the CDHS further includes a data storage for the spacecraft airlock.

4. The spacecraft airlock of claim 2, further comprising:
    a data interface between the CDHS and a data port of the active common berthing mechanism; and
    a data connection between the CDHS and the at least one attachment mechanism on the exterior surface, such that the CDHS is configured to act as a primary command and data path for any vacuum exposed payloads releasably attached to the at least one attachment mechanism of the exterior surface.

5. The spacecraft airlock of claim 1, further comprising:
    an active cooling interface configured to engage with a low temperature cooling loop via the active common berthing mechanism; and
    a cooling device engaged with the active cooling interface, and configured to provide active cooling to any vacuum exposed payloads releasably attached to the at least one attachment mechanism of the exterior surface.

6. The spacecraft airlock of claim 1, wherein the EPS is positioned in the interior.

7. The spacecraft airlock of claim 6, further comprising:
    payload avionics positioned within the interior and configured to interface with one or more payload sensors releasably attached to the at least one attachment mechanism of the exterior surface.

8. The spacecraft airlock of claim 1, further comprising:
    a seat track positioned within the interior.

9. The spacecraft airlock of claim 1, wherein the exterior surface includes at least one grapple point that is configured to be engaged by a robotic arm, the grapple point positioned on the exterior surface such that the robotic arm is operable to transition the spacecraft airlock between the berthed configuration and a deployed configuration.

10. The spacecraft airlock of claim 1, further comprising:
    airlock mechanism core system avionics positioned within the interior.

11. A method of operating a spacecraft airlock, comprising:
    operating an engagement between (i) a passive common berthing mechanism positioned around an open end of an interior defined by a module of the spacecraft airlock, and (ii) an active common berthing mechanism, wherein:
the module further includes a closed end opposite the open end of the interior;
the interior is configured to receive pressurized air from the active common berthing mechanism in a berthed configuration with the passive common berthing mechanism;
the module includes an exterior surface having at least one attachment mechanism configured to releasably attach one or more vacuum exposed payloads to the exterior surface; and
the exterior surface is a longitudinal surface between the open end and the closed end; and
operating an engagement between a duel feed power supply of an Electrical Power System (EPS) of the spacecraft airlock and a power supply output of the active common berthing mechanism, the EPS configured to provide one or more of power control, isolation, circuit protection, or regulation to any vacuum exposed payloads releasably attached to the at least one attachment mechanism of the exterior surface.

12. The method of claim 11, further comprising:
operating a data interface between a Command and Data Handling System (CDHS) of the module and a data connection of the active common berthing mechanism, the CDHS configured to command and control any vacuum exposed payloads releasably attached to the at least one attachment mechanism of the exterior surface.

13. The method of claim 12, wherein:
the CDHS provides a data connection from the active common berthing mechanism and the at least one attachment mechanism on the exterior surface, such that the CDHS is configured to act as a primary command and data path for any vacuum exposed payloads releasably attached to the at least one attachment mechanism of the exterior surface.

14. The method of claim 11, further comprising:
operating an engagement between a low temperature cooling loop of the active common berthing mechanism and an active cooling device of the spacecraft airlock that is configured to provide active cooling to any vacuum exposed payloads releasably attached to the at least one attachment mechanism of the exterior surface.

15. The method of claim 11, wherein the EPS is positioned in an interior of the module.

16. The method of claim 15, wherein:
payload avionics of the spacecraft airlock are positioned within the interior and configured to interface with one or more payload sensors releasably attached to the at least one attachment mechanism of the exterior surface.

17. The method of claim 15, wherein airlock mechanism core system avionics are positioned within the interior.

18. The method of claim 11, wherein the exterior surface includes at least one grapple point that is configured to be engaged by a robotic arm, the grapple point positioned on the exterior surface such that the robotic arm is operable to transition the spacecraft airlock between the berthed configuration and a deployed configuration.

19. A spacecraft airlock, comprising:
a module defining an interior with an open end, and including:
a passive common berthing mechanism positioned around the open end, such that the interior is configured to receive pressurized air from an active common berthing mechanism in a berthed configuration with the passive common berthing mechanism;
an exterior surface having at least one attachment mechanism configured to releasably attach one or more vacuum exposed payloads to the exterior surface;
an Electrical Power System (EPS) that includes a dual feed power supply configured to interface with a power supply output of the active common berthing mechanism in the berthed configuration, and that is configured to provide one or more of power control, isolation, circuit protection, or regulation to any vacuum exposed payloads releasably attached to the at least one attachment mechanism of the exterior surface;
a Command and Data Handling System (CDHS) configured to command and control any vacuum exposed payloads releasably attached to the at least one attachment mechanism of the exterior surface;
payload avionics positioned within the interior and configured to interface with one or more payload sensors releasably attached to the at least one attachment mechanism of the exterior surface; and
airlock mechanism core system avionics positioned within the interior.

20. The spacecraft airlock of claim 19, wherein the exterior surface includes at least one grapple point that is configured to be engaged by a robotic arm, the grapple point positioned on the exterior surface such that the robotic arm is operable to transition the spacecraft airlock between the berthed configuration and a deployed configuration.

* * * * *